United States Patent
Kunduru et al.

(10) Patent No.: US 11,290,497 B2
(45) Date of Patent: Mar. 29, 2022

(54) ACCESS-CONTROL LIST GENERATION FOR SECURITY POLICIES

(71) Applicant: Arista Networks, Inc., Santa Clara, CA (US)

(72) Inventors: Charanjith Kunduru, Santa Clara, CA (US); Anuraag Mittal, Livermore, CA (US); Som Neema, Fremont, CA (US)

(73) Assignee: ARISTA NETWORKS, INC., Santa Clara, CA (US)

( * ) Notice: Subject to any disclaimer, the term of this patent is extended or adjusted under 35 U.S.C. 154(b) by 371 days.

(21) Appl. No.: 16/521,351

(22) Filed: Jul. 24, 2019

(65) Prior Publication Data

US 2021/0029174 A1 Jan. 28, 2021

(51) Int. Cl.
*H04L 29/06* (2006.01)

(52) U.S. Cl.
CPC .......... *H04L 63/205* (2013.01); *H04L 63/101* (2013.01)

(58) Field of Classification Search
CPC ..... H04L 63/205; H04L 63/101; H04L 63/10; H04L 63/102; H04L 63/105; H04L 63/107; H04L 63/104; H04L 63/20
See application file for complete search history.

(56) References Cited

U.S. PATENT DOCUMENTS

| | | | | |
|---|---|---|---|---|
| 2003/0115313 A1* | 6/2003 | Kanada | ............... | H04L 41/0213 709/223 |
| 2010/0266131 A1* | 10/2010 | Cilfone | ............... | H04L 67/1042 380/285 |

OTHER PUBLICATIONS

"ACLs and Route Maps", Chapter 24, Access Control Lists, pp. 1233-1353, Jun. 17, 2019.
"Multi-Chassis Link Aggregation", Chapter 13, MLAG Introduction, pp. 655-694, Jun. 17, 2019.

* cited by examiner

*Primary Examiner* — Edward Zee
(74) *Attorney, Agent, or Firm* — Fountainhead Law Group P.C.

(57) ABSTRACT

Security policies are translated into access-control list entries and can be stored by switches in the computer network. When a new device is connected to the computer network, the device may be resolved to the group for which it is a member and an ACL entry may be created for the new device. In networks having redundant switches, the ACL entries may be stored by each redundant network switch.

34 Claims, 15 Drawing Sheets

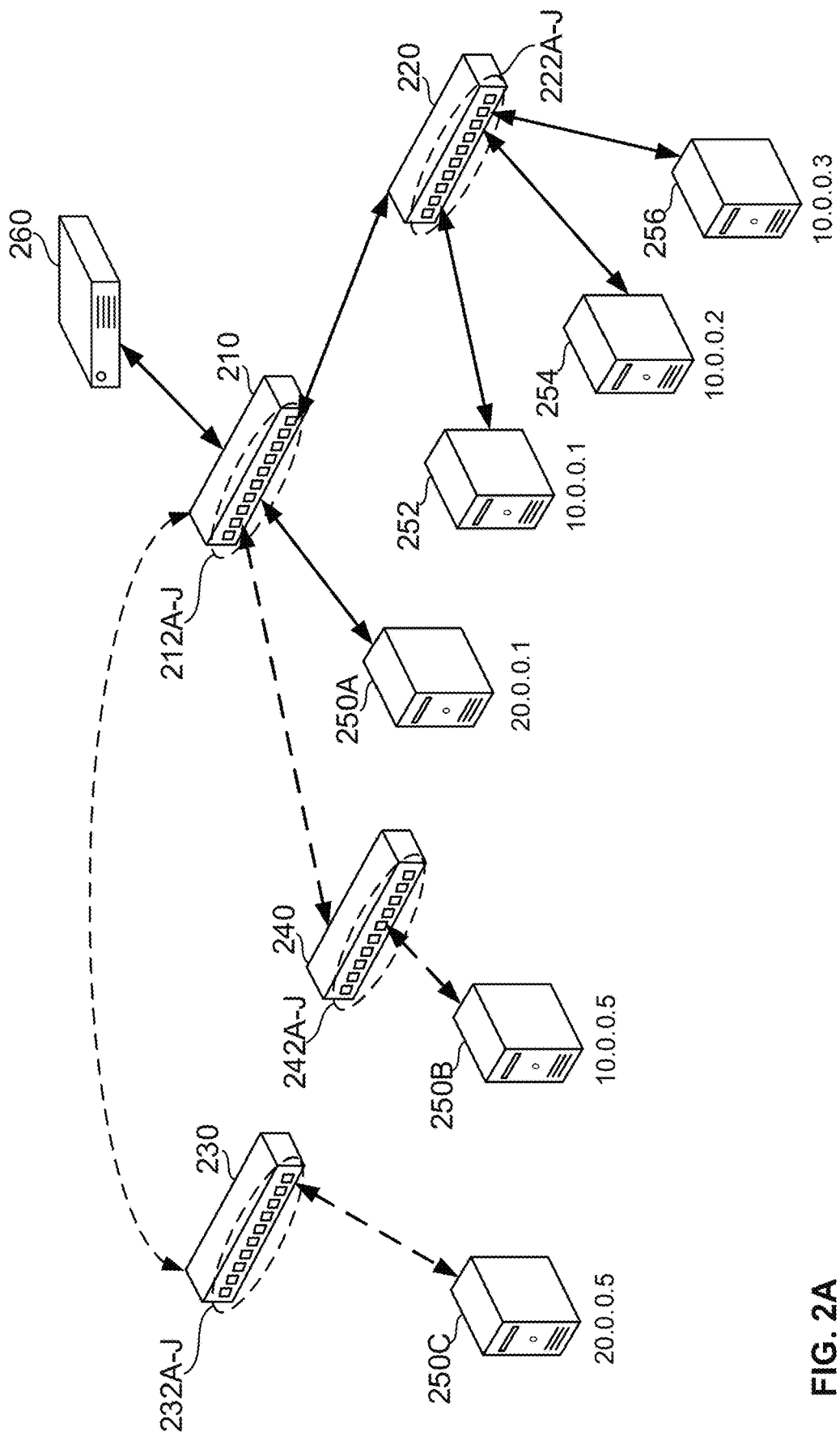

ACCESS-CONTROL LIST GENERATION FOR SECURITY POLICIES

BACKGROUND

The present disclosure relates to automatically generating or updating access-control lists (ACLs) for network switches based on one or more security policies.

BRIEF DESCRIPTION OF THE DRAWINGS

Various objects and advantages of the disclosure will be apparent upon consideration of the following detailed description, taken in conjunction with the accompanying drawings, in which like reference characters refer to like parts throughout, and in which:

FIG. 2A shows an illustrative network topology of a system for generating and updating an ACL based on a security policy, in accordance with some embodiments of the disclosure;

DETAILED DESCRIPTION

Figure 1:
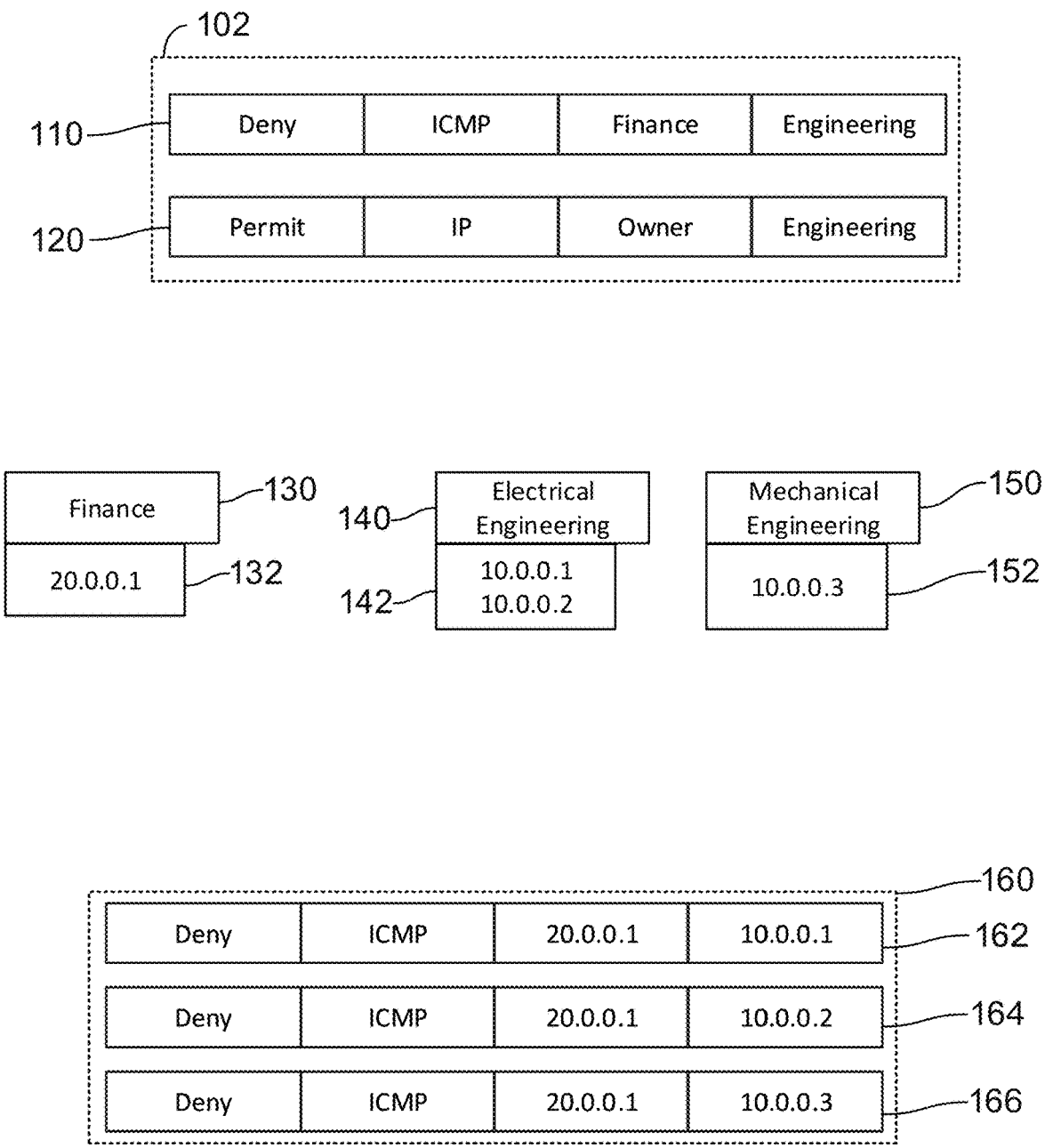
FIG. 1 shows illustrative diagram of a security policy translated into ACL entries, in accordance with some embodiments of the disclosure.

In some computer networks, security policies define rules controlling network traffic between hosts on the network. For example, a security policy may allow or prevent a particular type of network traffic between a specific host (or group of hosts) and another host (or group of hosts). Security policies are implemented as ACLs stored by switches on the computer network. Maintaining ACLs is an extremely laborious, manual task. Network administrators must manually translate a security policy into ACL entries and enter the ACL entries on every switch. When a new host is added, or an existing host moves to a different switch, or even just to a different interface of the same switch, the ACL entries must be manually updated.

Systems and methods described below automatically translate security policies into ACL entries by resolving the hosts to which the security policies apply. In some embodiments, a security policy includes an action (e.g., permit or deny), a network protocol (e.g., internet control message protocol (ICMP), internet protocol (IP), etc.), a source group (from which the network traffic originates), and a destination group (where the network traffic is headed). Each group (i.e., the source group and the destination group) is defined as a logical set of tags and may thus include a single tag or multiple tags, and each tag may be assigned to a single interface or multiple interfaces of a switch, and/or to a single host or multiple hosts (e.g., to all hosts in a particular subnet). A network controller device, and/or each individual switch in the network, determines to which hosts the security policy applies based on tags included in the source group and the destination group.

Hosts may be tagged, in some embodiments, by a switch that automatically discovers and tags the hosts connected to it. For example, when a new host is connected to a network interface of a switch, the switch assigns the tag of the network interface to the host. In some embodiments, the network interfaces of the switch are preconfigured with tags (e.g., a network administrator may provide tag assignments for the network interfaces via a command line interface). In other embodiments, the network controller device may provide the switch with tags for the network interfaces. The network controller may pre-assign tags to network interfaces or may provide tags to network interfaces as the network interfaces come into use. For example, when a new host is connected to a network interface of the switch, the switch may identify and provide the network address of the host to the network controller. The network controller may then provide to the switch a tag for the network interface to which the new host is connected. If the network interface is connected to a second switch, all hosts connected to the second switch may be tagged with the tag of the network interface. Likewise, hosts included in a virtual local area network (VLAN) may be tagged with a tag assigned to an access port on a switch when the access port is assigned to the VLAN.

In some embodiments, hosts are tagged with a tag assigned to a subnet. For example, the network controller may assign to a particular subnet or network address prefix a particular tag. When a host having a network address in the subnet is detected on a network interface of a switch, the switch tags the host with the tag assigned to the subnet. For example, the switch may retrieve the tag assigned to the subnet from a database and/or another device (such as the network controller) and then store the network address of the host in an entry for the tag in a table associating tags with network addresses.

Hosts connected to an interface of a switch may be discovered when the switch receives a message or data packet including the host's IP and/or media access control (MAC) address. For example, the switch may receive an address resolution protocol (ARP) message (e.g., a gratuitous ARP message) from a new host connected to the network and may extract the host's IP and/or MAC address from the ARP message. Likewise, the switch may receive a data packet and extract the host's IP and/or MAC address from the header of the data packet.

Once the network controller or switch determines that a security policy applies to a particular host, the network controller or switch identifies a network address of the particular host and a network address of a host in the other group (that is, if the particular host is in the source group, a network address of a host in the destination group will be identified, and vice versa). The network controller may determine which security policies apply to which switches and may transmit the security policies, and/or the ACL entries, to only those switches to which the security policies apply. This ensures that switches store only the ACL entries that they need, thereby reducing unnecessary network traffic caused by security policies being provided to switches that do not need them. Providing only the security policies, and/or ACL entries, that apply to a particular switch also reduces memory and processing loads on the switch because the switch's ACL includes only entries relevant to the switch, which in turn reduces the processing load on the switch both for maintaining the ACL and for using the ACL (e.g., to find an ACL entry that applies to received data traffic).

The network controller may determine that a particular security policy applies to multiple switches and may translate the security policy (and/or the ACL entries generated based on that security policy) to each of the relevant switches. When a new host is connected to a switch, the network controller and/or the switch may generate new ACL entries for security policies that apply to the new host. The network controller may also identify additional switches that are affected by the addition of the host and provide new ACL entries for the new host to the identified switches.

Further, in embodiments where switches operate in redundant configurations, the network controller and/or a first switch in the redundant configuration may identify a second switch in the redundant configuration and may determine that an ACL entry generated for the first switch is also needed for the second switch. The network controller and/or the first switch may then provide the ACL entry generated for the first switch to the second switch.

Disclosed below are various systems and methods for translating network security policies into ACL entries for network switches. Security policies are represented as code stored in a network controller or a switch, and include rules defining actions to perform on network traffic between groups of hosts. Groups are defined in code as logical groupings of tags. Tags are represented as code pairing host IDs (e.g., network or link layer addresses such as IP or MAC addresses) with particular interfaces of network switches. FIG. 1 illustrates various elements of an illustrative security policy, and elements of illustrative ACL entries resulting from the policy. In this example, security policy "X" (depicted as security policy 102) is defined as having two rules:

Policy X
deny icmp Finance Engineering
permit ip Owner Engineering

The first rule (depicted as rule 110) denies ICMP traffic originating at a host within a Finance group and destined for a host within an Engineering group. The second rule (depicted as rule 120) permits IP traffic originating at a host within the Owner group and destined for a host within the Engineering group. Each group (e.g., the Finance group, the Engineering group, the Owner group) is defined as a logical set of tags that is resolved to a set of hosts. For example:

group Engineering: tag Electrical Engineering or Mechanical Engineering
group Finance: tag Finance
group Owner: tag Electrical Engineering or Mechanical Engineering or Finance In this example, the Engineering group is defined by an "Electrical Engineering" tag (depicted as tag 140) and a "Mechanical Engineering" tag (depicted as tag 150); the Finance group is defined by a "Finance" tag (depicted as tag 130); and the Owner group is defined by the "Electrical Engineering" tag, the "Mechanical Engineering" tag, and the "Finance" tag. Some groups, such as the Finance group, include a single tag (e.g., tag 130), while other groups, such as the Engineering group and the Owner group, include multiple tags (e.g., tags 140 and 150 for the Engineering group, and tags 130, 140, and 150 for the Owner group).

Illustrative Code for Defining the Tags is as Follows:

```
interface Et1
    ip address 10.0.0.1/24
    tag Electrical Engineering
interface Vlan2
    ip address 20.0.0.1/24
interface Et2
    switchport access Vlan2
    tag Finance
interface Et3
    ip address 10.0.0.1/24
    tag Mechanical Engineering
```

In this example, interface Et1 of a network switch is paired to network address 10.0.0.1/24 and is assigned the tag "Electrical Engineering." A virtual local area network, Vlan 2, is paired to network address 20.0.0.1/24 and is tagged "Finance" for traffic over a second interface (e.g., Et2). A third interface (e.g., Et3) is paired to network address 10.0.0.1/24 and is assigned the tag "Mechanical Engineering."

A network device, such as a network switch or a network controller, detects when hosts are connected to switch interfaces and assigns tags to hosts based on the policy, if applicable. An illustrative example of hosts detected on the interfaces is as follows:

```
Electrical Engineering:
    IP: 10.0.0.1(Et1), 10.0.0.2(Et1)
Mechanical Engineering:
    IP: 10.0.0.3(Et3)
Finance:
    IP: 20.0.0.1(Et2)
```

In this example, when hosts with IP addresses 10.0.0.1 and 10.0.0.2 are detected on interface Et1, the hosts are assigned an "Electrical Engineering" tag. An association between the tag (e.g., "Electrical Engineering" tag) and the network addresses of the hosts (e.g., 10.0.0.1 and 10.0.0.2) is stored (depicted in FIG. 1 as Electrical Engineering hosts 142). When a host having an IP address of 20.0.0.1 is detected on Vlan 2 and is connected to interface Et2 of the switch, the host is assigned the "Finance" tag (depicted in FIG. 1 as tag 130). An association between the "Finance" tag and the host address 20.0.0.1 is stored (depicted in FIG. 1 as Finance hosts 132). When a host having an IP address of 10.0.0.3 is detected on interface Et3, the host is assigned the "Mechanical Engineering" tag (depicted in FIG. 1 as tag 150) and an association between the tag and the host is stored (depicted in FIG. 1 as Mechanical Engineering hosts 152). Although the network addresses are described as IPv4 addresses, other network addressing protocols, such as IPv6, can be used for layer 3 switches, or MAC addresses for layer 2 switches, without departing from the scope of the present disclosure. In some embodiments, the system will continue to detect and tag hosts on the interfaces (e.g., Et1, Et2, and Et3) as new hosts are connected or as new tags are created.

The security policy is translated into ACL entries based on the resolved hosts (e.g., Finance hosts 132, Electrical Engineering hosts 142, and Mechanical Engineering hosts 152). An illustrative example of three ACL entries (numbered 10, 20, and 30) generated based on the first rule (depicted as rule 110) is as follows:

ip access-list et2.in
      10 deny icmp 20.0.0.1 10.0.0.1
      20 deny icmp 20.0.0.1 10.0.0.2
      30 deny icmp 20.0.0.1 10.0.0.3

In this example, the ACL includes a header or title indicating the type of network traffic (in this example, IP) regulated by the ACL entries, the function of the ACL (i.e., an "access-list"), and a name of the ACL (in this example, "et2.in," which specifies the interface (e.g., network interface Et2) and direction of traffic (e.g., ingress) that is regulated by the ACL). As noted above, the Finance group includes only one tag, "Finance" (tag 130), which is assigned to one host at address 20.0.0.1 (Finance hosts 132). Therefore, the source address for each of the ACL entries corresponding to the first rule (rule 110) will include a source address of 20.0.0.1. The Engineering group includes three hosts, a host at address 10.0.0.1, a host at 10.0.0.2, and a host at 10.0.0.3 (Electrical Engineering hosts 142 and Mechanical Engineering hosts 152). In this example, there are three possible destination pairs for communication from the Finance group to the Engineering group. An ACL entry is generated for each pair (the ACL entries depicted above and in table 160 of FIG. 1). For example, ACL entry 10 (depicted in FIG. 1 as ACL entry 162) causes a switch to deny ICMP traffic originating from a host at address 20.0.0.1 (one of Finance hosts 132) and destined for a host at address 10.0.0.1 (one of Electrical Engineering hosts 142); ACL entry 20 (depicted in FIG. 1 as ACL entry 164) causes the switch to deny ICMP traffic originating from a host at address 20.0.0.1 and destined for a host at address 10.0.0.2 (one of Electrical Engineering hosts 142); ACL entry 30 (depicted in FIG. 1 as ACL entry 166) causes the switch to deny ICMP traffic originating from a host at address 20.0.0.1 (one of Finance hosts 132) and destined for a host at address 10.0.0.3 (one of Mechanical Engineering hosts 152).

A similar translation from a security policy rule to ACL entries occurs for the second rule (e.g., depicted as rule 120). The second rule permits IP traffic originating at hosts tagged "Finance," "Electrical Engineering," or "Mechanical Engineering" (tags in the Owner group) and destined for hosts tagged "Electrical Engineering" or "Mechanical Engineering" (tags in the Engineering group). In this example, there are nine destination pairs that exist for traffic originating from hosts of the Owner group and destined for hosts of the Engineering group. An ACL entry is generated for each pair permitting IP traffic originating at an address of a host within the Owner group and destined for a host within the Engineering group.

In some embodiments, ACL entries are generated for both directions of network traffic. For example, as shown below, a complementary ACL may be generated for network traffic flowing in the opposite direction to the ACL shown in the example provided above.

ip access-list et2.out
      10 deny icmp 10.0.0.1 20.0.0.1
      20 deny icmp 10.0.0.2 20.0.0.1
      30 deny icmp 10.0.0.3 20.0.0.1

In this example, the ACL includes a header or title including the same information as the example provided above, except that the name of the ACL in this example, "et2.out," specifies that the ACL regulates traffic on network interface Et2 in the egress direction of traffic.

Each of the ACL entries is stored on a switch having an interface to which the ACL entry applies. For example, the switch corresponding to Et2 stores the ACL entry for the Et2 interface. The ACL entry is stored in an ACL corresponding to an ingress direction of the Et2 interface because all traffic originating by the host at 20.0.0.1 would ingress into the Et2 port. Accordingly, the switch can monitor the traffic entering the Et2 port and can deny traffic matching an ACL entry—for example, ICMP traffic having an origin address 20.0.0.1 and destination address of 10.0.0.1 (when applying ACL entry 162). If, for example, Electrical Engineering hosts 142 are connected to a first switch, but Finance hosts 132 are connected to a second switch, ACL entries 162, 164, and 166 are stored by the second switch (because in this example ACL entries 162, 164, and 166 relate to host 20.0.0.1 connected to the second switch) but not the first switch. In some embodiments, a network controller stores an indication of a switch to which each host is connected and transmits the ACL entries to the switches to which the ACL entries apply. In this example, the network controller transmits ACL entries 162, 164, and 166 to the second switch but not to the first switch.

FIG. 2A shows an illustrative network topology 200A of a system for generating and updating ACLs based on security policies. In particular, network topology 200A includes network devices 210, 220, 230, and 240; a plurality of hosts 250A, 250B, 250C, 252, 254, and 256; and a network controller 260. Network devices 210-240 may each be any suitable routing or switching device, such as a layer 2 network switch, a layer 3 network switch, a router, etc.

The network devices shown in network topology 200A each include several network interfaces (network interfaces 212A-J, 222A-J, 232A-J, and 242A-J, respectively). Network interfaces 212A-J, 222A-J, 232A-J, and 242A-J may be any type of network interface, such as an RJ45 ethernet port, a coaxial port, etc. Although FIG. 2A shows that each of network devices 210, 220, 230, and 240 has ten network interfaces, this is merely illustrative, and those skilled in the art will appreciate that there may be more or fewer network interfaces on each of network devices 210, 220, 230, and 240. Further, the network interfaces may not be wired interfaces as shown in FIG. 2A. In some embodiments, the network interfaces may be logical ports, wireless interfaces (e.g., 802.11x interfaces, BLUETOOTH interfaces, cellular interfaces, etc.).

Network devices 210, 220, 230, and 240 are communicatively coupled to one or more of hosts 250A, 250B, 250C, 252, 254, and 256 (e.g., a server, a workstation, a network access server (NAS), etc.) via the respective network interfaces. To avoid overcomplicating the drawing, network topology 200A is depicted as having four network devices and six hosts, but those skilled in the art will appreciate that the various embodiments described herein may be used with and/or applied to networks having any number of network devices and hosts. In network topology 200A, network device 210 (e.g., a layer 3 switch) is communicatively coupled to network device 220 (e.g., a layer 2 switch) via a network coupling (e.g., an ethernet or fiber optic cable) between a network interface of network device 210 (e.g., network interface 212J) and a network interface of network device 220 (e.g., network interface 222A). Network device 210 is additionally communicatively coupled to host 250A via a network interface of network device 210 (e.g., network interface 212D). Network device 220 is communicatively coupled to hosts 252, 254, and 256 via network interfaces of network device 220 (e.g., network interfaces 222B, 222H, and 222I).

Hosts on the network may communicate via the network devices. For example, host 254 may communicate with host 252 via network device 220. Host 254 may transmit a frame addressed to host 252 via interface 222H of network device 220. Network device 220 may receive the frame and may identify a network interface (e.g., network interface 222B) corresponding to the destination (e.g., host 252). In response to identifying the interface, network device 220 may forward the frame on to host 252 via network interface 222B. In some embodiments, a host connected to one network device may communicate with a host connected to another network device. For example, host 254 may communicate with host 250A via network devices 220 and 210.

In some embodiments, each of the network devices stores ACL entries (such as ACL entries 162, 164, and 166 described above with reference to FIG. 1) defining which hosts are permitted to communicate with each other and what types network traffic are permitted between the hosts. For example, network device 220 may store an ACL entry prohibiting traffic from host 254 to host 252. In such embodiments, when network device 220 receives a frame from host 254 destined for host 252 (e.g., via network interface 222H), network device 220 will drop the frame without forwarding the frame to host 252. In some embodiments, not all network devices maintain an ACL or store all ACL entries. For example, some network devices may not be connected to, or in a data path between, hosts to which security policies apply, and thus do not need to regulate network traffic for such hosts. In another example, the network devices that do not maintain an ACL may be in a data path between hosts to which security policies apply, but other network devices (e.g., network devices that are more closely connected to the hosts, network devices that have more resources such as processing power and/or memory, or simply other network devices chosen by network administrators) maintain ACLs to regulate traffic for those hosts, and thus the network devices without an ACL do not need to also maintain ACL entries for such hosts.

Network controller 260 receives, such as via user input provided via a user interface, and stores security policies (such as security policy 102 discussed above with reference to FIG. 1) for the network. Network controller 260 further receives, from network devices 210, 220, 230, and 240, data identifying hosts (e.g., network addresses of the hosts) that were discovered on their respective network interfaces and stores the data identifying the hosts in a table or other data structure (e.g., host table 422, described below with reference to FIG. 4B). In some embodiments, the data identifying the hosts further includes a tag assigned to each of the hosts. Network controller 260 then determines to which network devices the security policies apply and may transmit the security policies to such network devices. For example, network controller 260 may identify the tags included in the source group and the destination group of a security policy and determine which network devices are connected to hosts to which the identified tags are assigned.

In some embodiments, the network devices (e.g., network devices 210, 220, 230, and/or 240) receive the security policies (e.g., security policy 102) transmitted to them by network controller 260 and generate ACL entries (e.g., ACL entries 162, 164, and 166 of FIG. 1) based on the security policies (e.g., security policy 102 of FIG. 1). In other embodiments, network controller 260 does not transmit security policies to network devices, but instead translates the security policies into ACL entries, and transmits the ACL entries to the network devices to which they apply. For example, network controller 260, when determining to which network devices the security policies apply, may further retrieve a network address (e.g., an IP address and/or a MAC address) of the hosts tagged with the tags included in the source group and the destination group of the security policies. Network controller 260 may then generate the ACL entries based on the security policies and transmit the ACL entries to the hosts to which they apply.

A network device updates its ACL (e.g., ACL table 160 of FIG. 1) when a host is added or removed from an interface of the network device. For example, if host 250A is disconnected from interface 212D of network device 210, ACL entries including the network address of host 250A are removed from storage of network device 210 (e.g., because host 250A is no longer connected to network device 210 and therefore the ACL entries are no longer needed). If host 250A is later connected to network interface 242F of network device 240 (depicted as host 250B), network device 240 may generate new ACL entries for host 250B based on the security policy. Likewise, if host 250A or 250B is later connected to network interface 232J of network device 230 (depicted as host 250C), network device 230 may generate new ACL entries for host 250C based on the security policy. A network device may also update its ACL (e.g., add or remove ACL entries) in response to receiving commands from a user (e.g., via a command line interface) and/or from a separate device (e.g., network controller 260). For example, network device 210 may receive data for an ACL entry (i.e., an IP address and a MAC address) for a new host before the new host is connected to an interface of network device 210. Network device 210 may then add an ACL entry for the new host to its ACL before the new host is connected to the network.

Figure 2B:
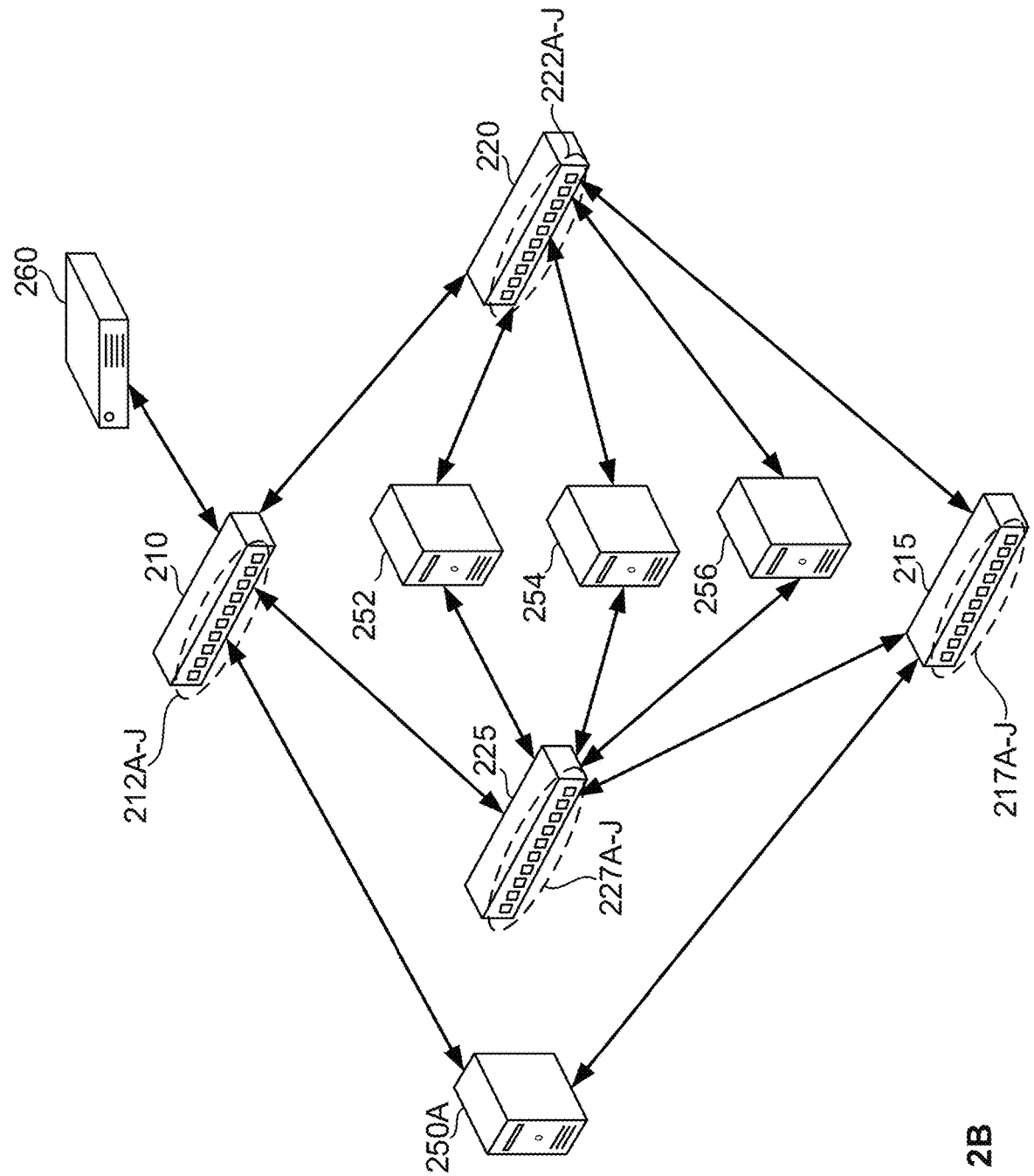
FIG. 2B shows an illustrative network topology of a system having multiple redundant network switches that generates an ACL based on a security policy, in accordance with some embodiments of the disclosure.

FIG. 2B shows an illustrative network topology 200B of a system, having multiple redundant network devices, that generates ACL entries based on security policies. Network topology 200B differs from network topology 200A in that network devices 215 and 225 provide redundant functionality to network devices 210 and 220. Accordingly, the connections between network devices 210 and 220 to hosts 250A, 252, 254, and 256 are duplicated for network devices 215 and 225, respectively. For example, in network topology 200B, network device 215 (e.g., a layer 3 switch) provides duplicate functionality to that of network device 210 (e.g., a layer 3 switch). Network device 215 is depicted having interfaces 217A-J. While network device 215 may have any number of interfaces, in some embodiments, network device 215 has at least a same number of active interfaces as network device 210 (e.g., network device 210 has four active interfaces connected to other devices). As an example, host 250A is connected to interface 212D of network device 210 and host 250A is connected to interface 217D of network device 215. Network device 225 (e.g., a layer 2 switch) may provide redundant functionality to that of network device 220 (e.g., a layer 2 switch). For example, the network connections between hosts 252 and 254 to network device 220 are duplicated for network device 225 (e.g., host 252 may be connected to network interface 222A of network device 220 and connected to network interface 227B of network device 225). Although hosts 252, 254, and 256 are described as being connected to particular interfaces, hosts 252, 254, and 256 may be connected to any interface (e.g., interfaces 227A-J) of network device 225 without departing from the scope of the present disclosure.

In some embodiments, network devices 210 and 215 (e.g., layer 3 switches), and network devices 220 and 225 (e.g., layer 2 switches), may be configured as a Multi-Chassis Link Aggregation (MLAG) virtual switch. When network devices 210 and 215 are configured as an MLAG virtual switch, host 250A may upload the same data to both network devices 210 and 215 simultaneously. In such configurations, network devices 210 and 215 provide both increased bandwidth and redundancy in case of a failure of one of network devices 210 and 215. For example, if network device 210 fails, all data will be transmitted from host 250A just to network device 215. Because network device 215 provides redundant functionality of network device 210, host 250A may still communicate with all devices on network topology 200B. Likewise, network devices 210 and 215 may be configured to connect to both of network devices 220 and 225, which may be configured to provide MLAG switching capability on layer 2 (i.e., the data link layer). For example, hosts 252, 254, and 256 may be connected to both network devices 220 and 225. Network devices 220 and 225 may be configured to provide both increased bandwidth and redundancy in case of a failure of one of devices 220 and 225. For example, in the event of failure of network device 225, data is transferred from hosts 252, 254, and 256 exclusively via network device 220 until network device 225 is repaired or replaced.

Network devices 210, 220, 215, and 225 may translate security policies (e.g., security policy 102 of FIG. 1) to ACL entries (e.g., ACL entries 162, 164, and 166 of FIG. 1) and duplicate the ACL entries to corresponding redundant network devices. For example, when network device 210 generates ACL entries prohibiting IP traffic originating at host 250A destined for host 252 and prohibiting IP traffic originating at host 250A destined for host 254, network device 210 may transfer the ACL entries to network device 215 so that network device 215 may also enforce the security policy without having to separately generate the same ACL entries. In some embodiments, when network devices are not connected to corresponding interfaces (e.g., when host 250A is connected to interface 212D on network device 210 but is connected to interface 217A on network device 215), the ACL entries are updated to correspond to the correct interface of host 250A. For example, the ACL entries may be associated with interface 212D on network device 210 (because host 250A is connected to interface 212D of network device 210) and may be associated with interface 217A on network device 215 (because host 250A is connected to interface 217A of network device 215. By allowing a network device to generate the ACL entries for another device having duplicate network functionality, system resources are conserved by eliminating the need to generate the ACL entries twice on different devices. Similarly, in embodiments where network controller 260 translates security policies into ACL entries, the network controller may transmit the ACL entries for redundant network devices (e.g., network devices 210 and 215, or network devices 220 and 225) to both network devices implementing the redundant configuration.

Figure 2C:
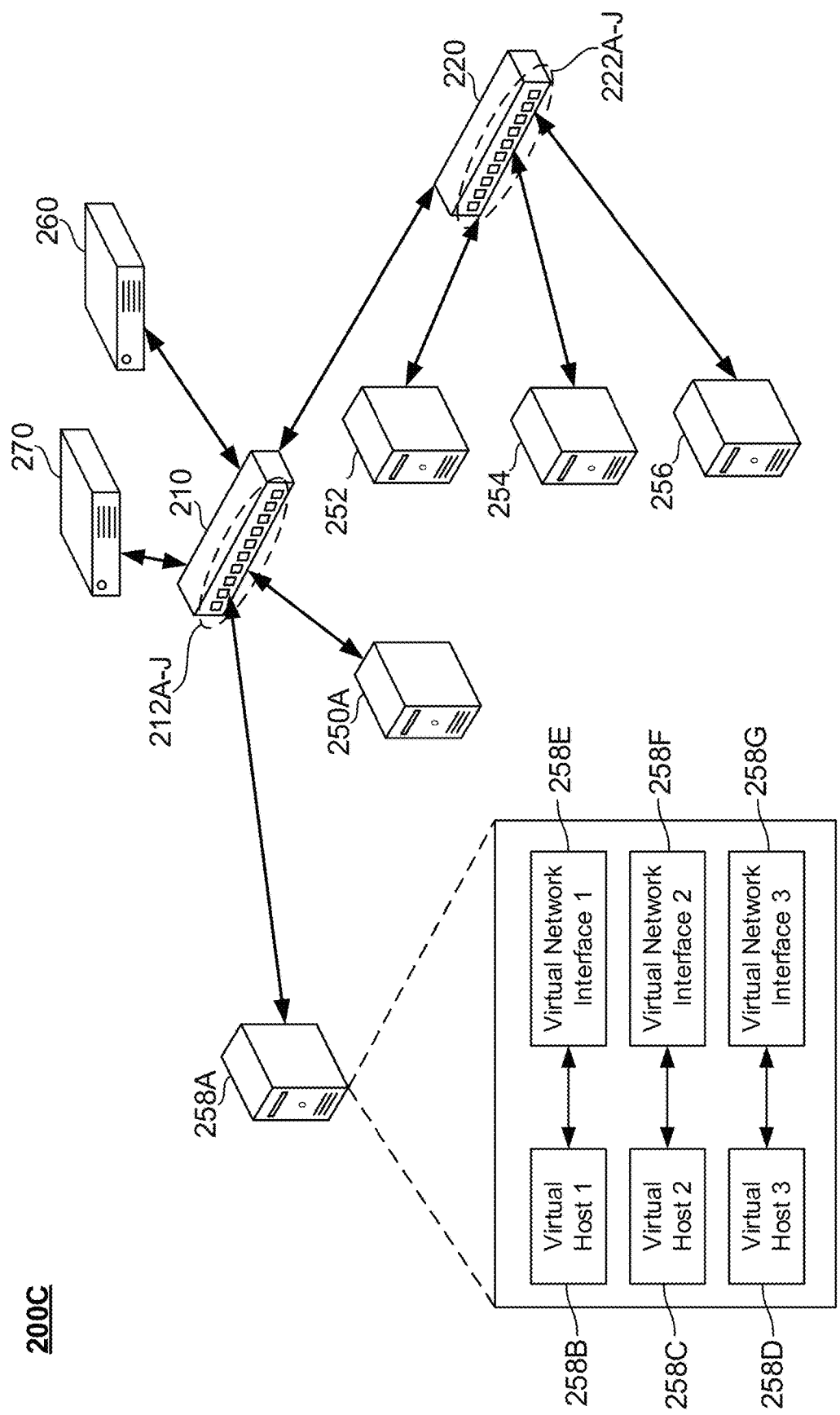
FIG. 2C shows an illustrative network topology of a system having virtual machine hosts, in accordance with some embodiments of the present disclosure.

FIG. 2C shows an illustrative network topology 200C of a system that generates ACL entries based on security policies for network devices in a network that includes physical hosts and virtual hosts. Network topology 200C differs from network topologies 200A and 200B in that a physical host 258A includes a plurality of virtual hosts 258B, 258C, and 258D, which are managed by virtual host management device 270. Each virtual host is configured with a corresponding virtual network interface (as shown in FIG. 2C, virtual host 258B has virtual network interface 258E, virtual host 258C has virtual network interface 258F, and virtual host 258D has virtual network interface 258G). In some embodiments, each virtual network interface is configured with a virtual network address or other identifier of the virtual network interface. Virtual hosts 258B, 258C, and 258D are able to communicate with other hosts on the network (e.g., hosts 250A, 252, 254, and 256) via virtual network interfaces 258E, 258F, and 258G, respectively.

While network device 210 is able to discover physical host 258A on network interface 212B (via which physical host 258A is connected to network device 210), using the various techniques described below, network device 210 may not be able to automatically discover virtual hosts 258B, 258C, and 258D operating on physical host 258A. For example, virtual host management device 270 and/or another virtual host controller (not shown in FIG. 2C) may prevent data traffic sent by one or more of virtual hosts 258B, 258C, and 258D from reaching network interface 212B of network device 210. Instead, virtual hosts 258B, 258C, and 258D may be tagged by virtual host management device 270 (such as via user input received via a user interface), and are associated with the physical host (e.g., physical host 258A) on which they operate and/or the network interface via which the physical host is connected to a network device (e.g., network interface 212B of network device 210). In some embodiments, virtual hosts 258B, 258C, and 258D are tagged with the same tag assigned to physical host 258A and/or network interface 212B. In other embodiments, virtual hosts 258B, 258C, and 258D are assigned tags that are different from the tag assigned to physical host 258A, and each of virtual hosts 258B, 258C, and 258D may be assigned the same or a different tag. The virtual hosts may further be associated with the virtual network address or other identifier of their respective virtual network interfaces. Virtual host management device 270 stores a table or other data structure with entries for each virtual host on the network, the entries including an identifier of the virtual host, the tag assigned to the virtual host, the virtual network address or other identifier of the virtual network interface of the virtual host, an identifier of the physical host on which the virtual host operates, and an identifier of the network device and/or interface to which the physical host is connected.

Network devices (e.g., network devices 210 and 220) and/or network controller 260 retrieve data for resolving the tag assigned to a virtual host (e.g., virtual hosts 258B, 258C, and 258D) into a network address (e.g., an IP address or MAC address) from virtual host management device 270. In particular, when network controller 260 and/or the network devices (e.g., network devices 210 and 220) translate a security policy (e.g., security policy 102 of FIG. 1) into ACL entries (e.g., ACL entries 162, 164, and 166 of FIG. 1), network controller 260 determines that a tag included in the source group and/or the destination group of the security policy is assigned to a virtual host, and retrieves the network address assigned to the physical host on which the virtual host operates (e.g., physical host 258A) from virtual host management device 270. Network controller 260 and/or network devices 210 and 220 then generate the ACL entries for the security policy using the network address assigned to physical host 258A for the virtual host.

Figure 3:
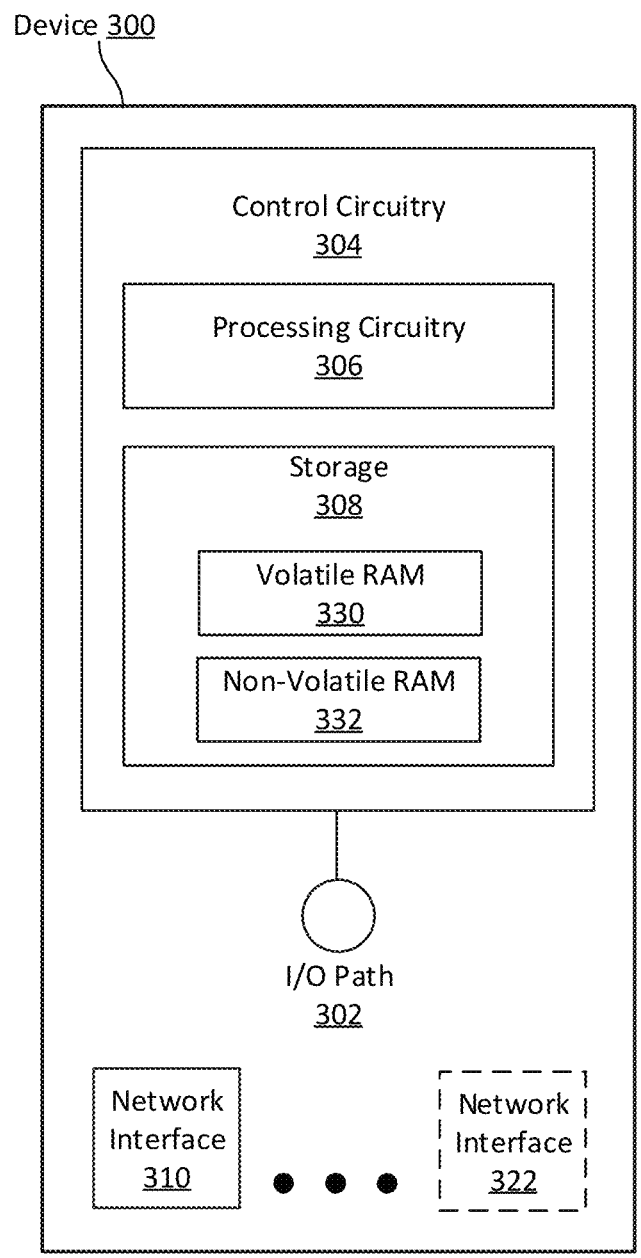
FIG. 3 shows a diagram of an illustrative network device for generating and updating an ACL based on a security policy in accordance with some embodiments of the disclosure.

FIG. 3 shows a generalized embodiment of a device 300 in accordance with some embodiments of the present disclosure. Device 300 may be any of the network devices depicted in FIGS. 2A, 2B, 2C, 4A, and 4B (e.g., network devices 210, 215, 220, 225, 230, 240, 418, and 432), and/or network controller 260. Device 300 may be a switch (e.g., a layer 2 or layer 3 switch), a network controller, and/or any other computing device that may be configured to receive a security policy and translate the security policy into one or more ACL entries (e.g., ACL entries 162, 164, 166 of FIG. 1). Device 300 may receive data via an input/output (I/O) path 302. I/O path 302 may provide a security policy to control circuitry 304, which includes processing circuitry 306 and storage 308. Storage 308 may include volatile random-access memory (RAM) 330, which does not retain its contents when power is turned off, and non-volatile RAM 332, which does retain its contents when power is turned off. Control circuitry 304 may send and receive commands, requests, and other suitable data using I/O path 302. I/O path 302 may connect control circuitry 304 (and specifically processing circuitry 306) to one or more network interfaces 310 to 322, which in turn connect device 300 to one or more network devices (e.g., network device 210). For example, in embodiments where device 300 is a switch (such as network devices 210, 215, 220, 225, 230, or 240), device 300 will have multiple network interfaces 310 to 322 that connect device 300 to various different network devices and/or hosts. Alternatively, in embodiments where device 300 is a network controller (such as network controller 260), device 300 will have fewer network interfaces (such as only one or two network interfaces) via which device 300 is connected to one or more network devices (e.g., network devices 210 and 215).

Control circuitry 304 may be based on any suitable processing circuitry, such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, octa-core, or any suitable number of cores). In some embodiments, processing circuitry is distributed across multiple separate processors or processing units, for example, multiple of the same type of processing units (e.g., two INTEL CORE i7 processors) or multiple different processors (e.g., an INTEL CORE i5 processor and an INTEL CORE i7 processor). In some embodiments, control circuitry 304 executes instructions for translating a security policy (e.g., security policy 102 of FIG. 1) into one or more ACL entries (e.g., ACL entries 162, 164, and 166 of FIG. 1).

For example, control circuitry 304 may receive a security policy via network interface 310, store the security policy in storage 308 (i.e., volatile RAM 330), translate the security policy into ACL entries (e.g., using an identifier (such as an IP address and/or media access control (MAC) address) of a host device), and store (e.g., in non-volatile RAM 332) the ACL entry. Control circuitry 304 may further cause the security policy and/or the ACL entry to be transmitted to the other network devices via a network interface (e.g., network interface 310).

Storage 308 may be an electronic storage device that is part of control circuitry 304. As referred to herein, the phrase "electronic storage device" or "storage device" should be understood to mean any device for storing electronic data, computer software, instructions, and/or firmware, such as RAM, content-addressable memory (CAM), hard drives, optical drives, solid state devices, quantum storage devices, or any other suitable fixed or removable storage devices, and/or any combination of the same. The circuitry described herein may execute instructions included in software running on one or more general purpose or specialized processors. Multiple circuits may be provided to handle simultaneous processing functions.

Figure 4A:
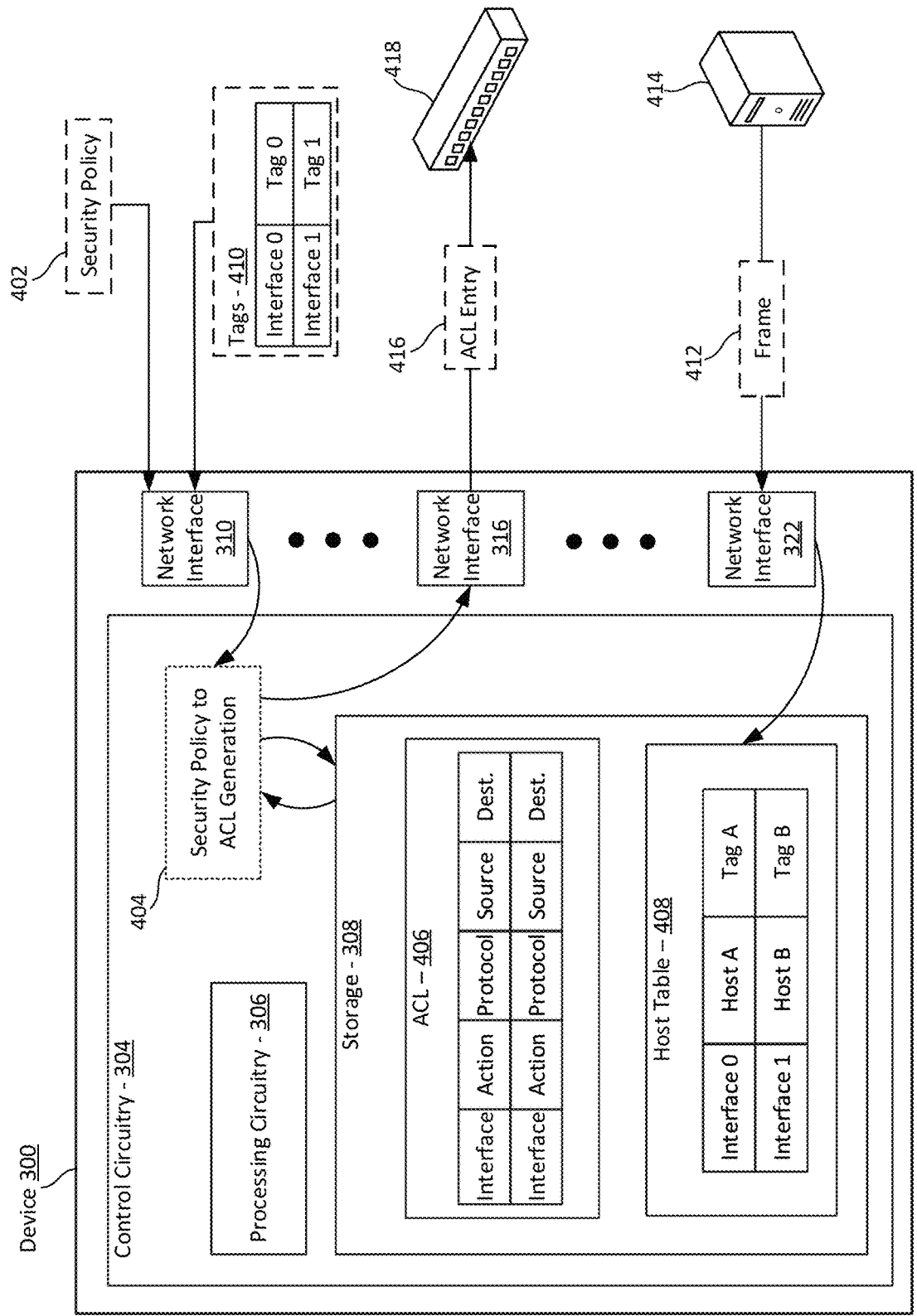
FIG. 4A shows an illustrative diagram of a procedure for generating an ACL based on a security policy on a network switch, in accordance with some embodiments of the present disclosure.

FIG. 4A illustrates the generation, by a network device, of an ACL entry based on a security policy, in accordance with some embodiments of the present disclosure. In particular, FIG. 4A depicts an embodiment where device 300 is an implementation of a network device (e.g., network device 210, 215, 220, 225, 230, and/or 240) that receives a security policy and translates the security policy (e.g., security policy 102 of FIG. 1) into one or more ACL entries (e.g., ACL entries 162, 164, and 166 of FIG. 1). Device 300 receives security policy 402 (e.g., security policy 102 described above with reference to FIG. 1) via network interface 310 of device 300. In some embodiments, security policy 402 is received via a network connection, such as an IP network connection, from another device, such as network controller 260.

In some embodiments, device 300 may comprise an ACL entry-generating unit 404 to translate the security policy into an ACL entry. ACL entry-generating unit 404 may be implemented in hardware, software, or any suitable combination of hardware and software (e.g., in control circuitry 304). For example, ACL entry-generating unit 404 may be a software program stored on storage 308 (e.g., non-volatile RAM 332) and executed by processing circuitry 306. Control circuitry 304 may receive security policy 402 via network interface 310. When control circuitry 304 receives policy 402 via network interface 310, control circuitry 304 identifies the action and protocol included in security policy 402. In some embodiments, control circuitry 304 may store the identified action and protocol in storage 308 while identifying hosts assigned to the tags included in the source group and the destination group.

Device 300 may store a mapping between groups and tags. Using the example provided in FIG. 1, control circuitry 304 may store in a database of storage 308 a mapping between the "Engineering" group and tags "Electrical Engineering" and "Mechanical Engineering." In instances where device 300 is not aware of a mapping between groups and tags (e.g., because the mapping is stored on a different device, such as network controller 260), device 300 may request the mapping between groups to tags from network controller 260. For example, device 300 may transmit a request via network interface 310 to network controller 260 that requests the mapping between groups and tags for the groups included in security policy 402. Following from the previous example, when device 300 requests the mapping from the "Engineering" group to its tags, device 300 may receive an indication that the "Engineering" group includes the tags "Electrical Engineering" and "Mechanical Engineering."

In some embodiments, device 300 resolves the tags to hosts that are associated with each tag. For example, control circuitry 304 may store (e.g., in a (described further below with reference to FIG. 4A) in storage 308) network addresses for a host (e.g., host 250A, 250B, 250C, 252, 254, and 256), and a network interface via which the host may be reached (e.g., one of network interfaces 310 through network interface 322). Control circuitry 304 may additionally store a tag that is assigned to the host. Again using the example described above with reference to FIG. 1, host 250A may be assigned the tag "Finance." Accordingly, control circuitry 304 may store data associating host 250A with the tag "Finance" in host table 408. While host table 408 is depicted as having fields indicating an interface, a host address, and a tag, this is merely illustrative, and any number of fields may be included. In some instances, the tags are stored with references to entries in an address resolution protocol (ARP) table, a neighbor discovery protocol (NDP) table, or a MAC table.

Control circuitry 304 may automatically discover and tag hosts connected to device 300. In some embodiments, network interfaces 310-322 of device 300 are preconfigured with tags (e.g., a network administrator may provide tag assignments for network interfaces 310-322 via a command line interface). In other embodiments, network controller 260 may provide device 300 with tags for network interfaces 310-322. Network controller 260 may pre-assign tags to network interfaces 310-322 or may provide tags to network interfaces 310-322 as device 300 detects data traffic on network interfaces 310-322. For example, when a new host (e.g., host 414) is connected to a network interface (e.g., network interface 322) of device 300, device 300 may identify and provide the network address of host 414 to network controller 260. Network controller 260 may then provide to device 300 a tag for network interface 322. Still using the example described above with reference to FIG. 1, when control circuitry 304 detects a new host connected via network interface 322, control circuitry 304 may store an address of the host (e.g., an IP address or a MAC address), the interface (e.g., network interface 322), and the tag (e.g., "Finance") in host table 408.

Alternatively, control circuitry 304 may discover hosts connected to device 300, identify network addresses (such as IP addresses or MAC addresses) for the hosts, and transmit the network addresses to network controller 260. List of tags 410 may include a network interface identifier for each network interface (e.g., network interfaces 310 to 322) of device 300, and a corresponding tag assigned to each interface. Additionally, list of tags 410 may include various other parameters, such as a host identifier (e.g., a network address of the host to which each tag is assigned). Those skilled in the art will appreciate that list of tags 410 as shown in FIG. 4A is merely illustrative and that various other parameters or values may be included in list of tags 410 without departing from the scope of the present disclosure. As shown in FIG. 4A, control circuitry 304 may discover a host 414 connected to network interface 322 based on receiving a frame 412, such as an address announcement message (e.g., gratuitous ARP requests or replies, or gratuitous NDP advertisement messages) including data identifying host 414 (e.g., the network addresses of host 414). In response to receiving the data identifying host 414 via network interface 322, control circuitry 304 assigns a tag to host 414.

Control circuitry 304 may translate security policy 402 into ACL entries based on the detected and tagged hosts and store the generated ACL entries in ACL 406. ACL 406 includes a plurality of ACL entries. To avoid overcomplicating the drawing, two ACL entries are depicted, each ACL entry having five fields. Illustrative ACL entry fields include a network interface to which the entry applies (e.g., interface 322), an action (e.g., permit or deny), a protocol (e.g., IP protocol), a source (e.g., an IP address of host 414), and a destination (e.g., an IP address of host 252). The ACL entries may additionally be assigned to either an ingress or egress direction of the interface. Accordingly, only the ingress or egress traffic will be inspected for compliance with the ACL. For example, because the two ACL entries apply to traffic originating from host 414, the ACL entries may be associated with an ingress direction of network interface 322 (e.g., because traffic sourced by host 414 will enter network interface 322).

In some embodiments, device 300 is in an MLAG configuration with another network device (e.g., network device 418). In such embodiments, device 300 may transmit the ACL entries (e.g., ACL entry 416) via network interface 316 to network device 418. Device 300 may be arranged as depicted as network device 210 of FIG. 2B and network device 418 may be arranged as depicted as network device 215 of FIG. 2B. In other embodiments, device 300 may be arranged as depicted as network device 220 of FIG. 2B and network device 418 may be arranged as depicted as network device 225 of FIG. 2B. Accordingly, devices 300 and 418 may both apply the ACL rules to traffic originating from host 414.

Figure 4B:
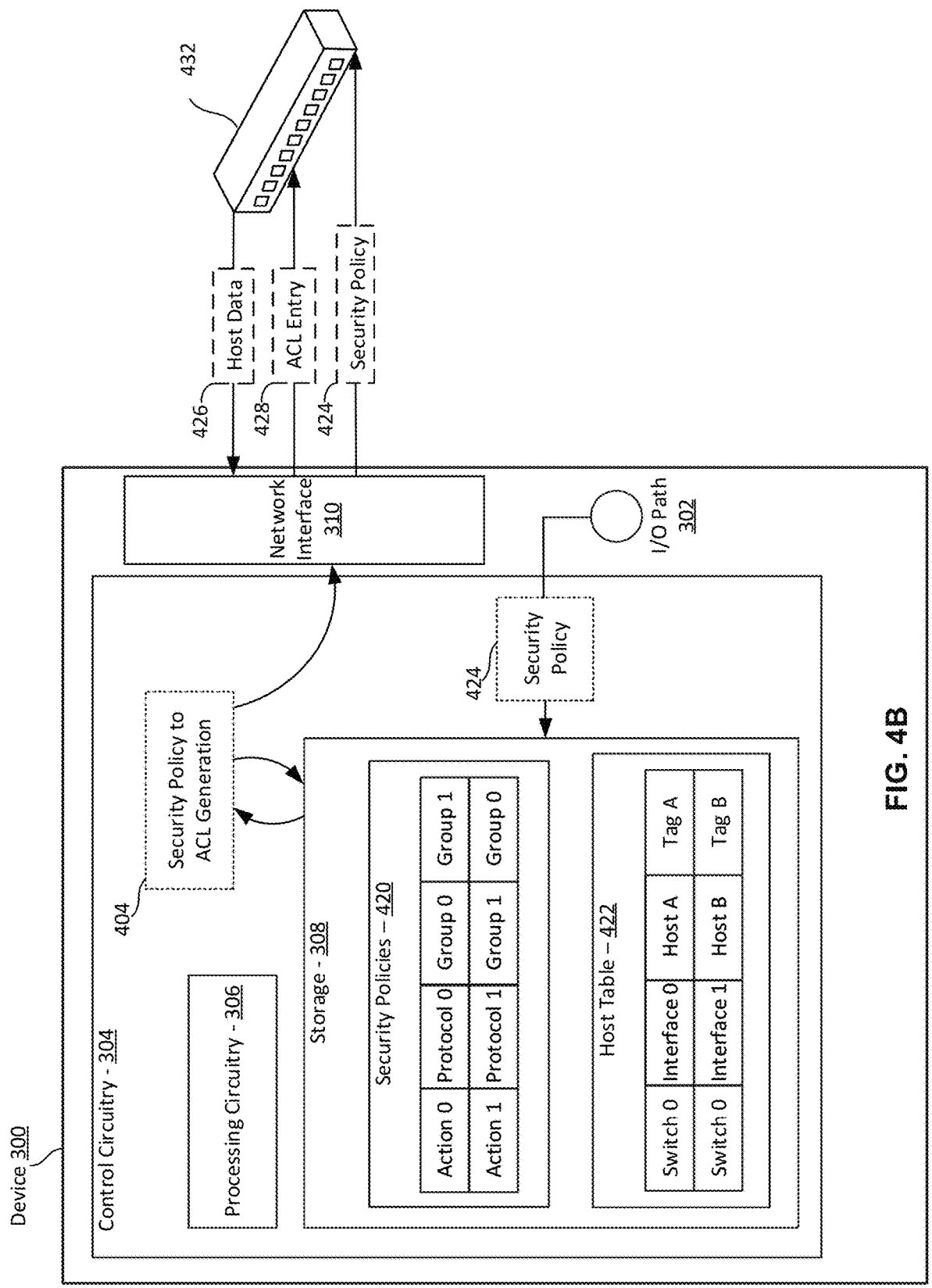
FIG. 4B shows an illustrative diagram of a procedure for generating an ACL based on a security policy on a network controller, in accordance with some embodiments of the present disclosure.

FIG. 4B illustrates the generation, by a network controller, of an ACL entry based on a security policy, in accordance with some embodiments of the present disclosure. In particular, FIG. 4B depicts an embodiment where device 300 is an implementation of network controller 260, which transmits security policies (e.g., security policy 102 of FIG. 1) and/or ACL entries (e.g., ACL entries 162, 164, and 166 of FIG. 1) to network devices to which the security policies and/or ACL entries apply. Device 300 receives a security policy 424 (e.g., corresponding to security policy 102 of FIG. 1) and stores security policy 424 in storage 308. For example, device 300 may receive security policy 424 via a user input interface (not shown in FIG. 4B) and provide security policy 424 to control circuitry 304 via I/O path 302. Control circuitry 304 may store security policy 424 in storage 308. For example, storage 308 may include a security policies table (or other data structure) 420 in which all security policies received by device 300 are stored. As noted above with reference to FIG. 1, security policies may include various fields or parameters (e.g., an action, a protocol, a source group, and a destination group), and the data in each of these fields may be stored in security policies table 420.

Upon receiving security policy 424, control circuitry 304 may identify network devices to which security policy 424 applies and may transmit security policy 424 to those network devices (e.g., network device 432). For example, control circuitry 304 may receive host data 426 (such as a network address of a host, a network interface to which the host is connected, and a network device on which the network interface is located) from a network device (e.g., network device 432), and store host data 426 in a host table 422. Host table 422 may be similar to host table 408

(described above with reference to FIG. 4A), except that the entries of host table 422 further include an identifier of a network device on which the network interface listed in the entry is located. Control circuitry 304 may then determine which tags are included in the source group and destination group of the security policy; retrieve, from host table 422, identifiers of network devices connected to hosts assigned to those tags; and transmit security policy 424 to the identified network devices.

Alternatively, device 300 may translate security policy 424 into one or more ACL entries and transmit the ACL entries to the network devices to which they apply. For example, control circuitry 304 may retrieve, from host table 422, the network addresses of the hosts assigned to the tags included in the source group and destination group and generate the ACL entries using the retrieved network addresses. Control circuitry 304 may then transmit the generated ACL entries (e.g., ACL entry 428) to one or more network devices (e.g., network device 432) to which the ACL entries apply.

Figure 5:
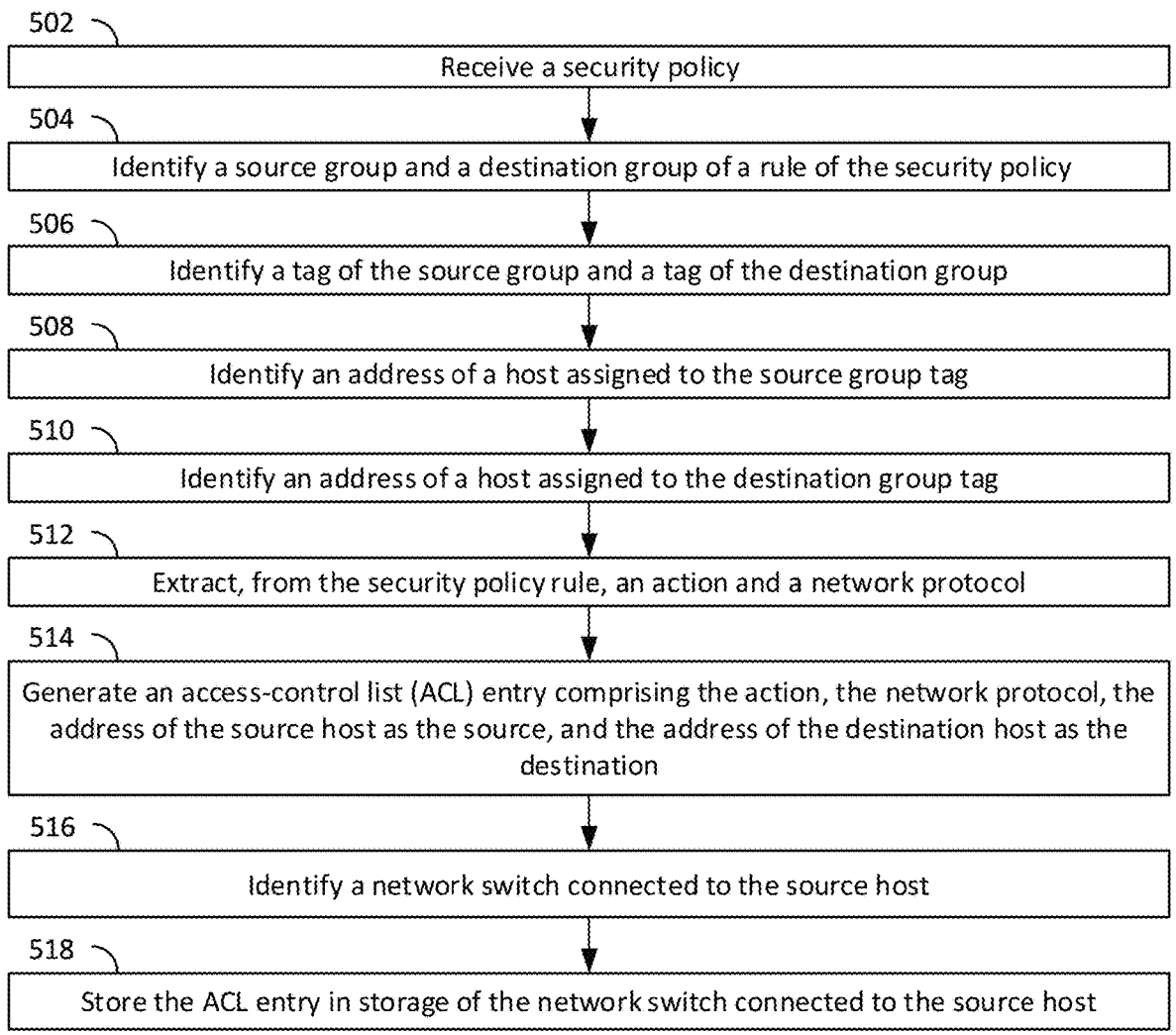
FIG. 5 is a flowchart of an illustrative process for translating a security policy into ACL entries, in accordance with some embodiments of the present disclosure.

FIG. 5 is a flowchart of an illustrative process 500 for translating a security policy into ACL entries, in accordance with some embodiments of the present disclosure. For example, process 500 generates ACL entries 162, 164, 166 of FIG. 1 based on security policy 102 of FIG. 1.

At 502, control circuitry 304 receives a security policy (e.g., security policy 102). The security policy may include one or more rules (e.g., rules 110 and 120 of FIG. 1), such as a rule prohibiting IP traffic originating from the Finance group and destined for the Engineering group (as an illustrative example).

At 504, control circuitry 304 identifies a source group and a destination group of a rule (e.g., rule 110) of the security policy. For example, control circuitry 304 identifies the source group based on data in the source group field of rule 110 (the Finance group, as described in FIG. 1) and identifies the destination group based on data in the destination group field of rule 110 (the Engineering group, as described in FIG. 1).

At 506, control circuitry 304 identifies a tag of the source group (e.g., the Finance group) and identifies a tag of the destination group (e.g., the Engineering group). The Finance group (the source group) includes the tag "Finance" (tag 130 of FIG. 1) and the Engineering group (the destination group) includes the tag "Electrical Engineering" (tag 140 of FIG. 1) and the tag "Mechanical Engineering" (tag 150 of FIG. 1). In some embodiments, control circuitry 304 identifies tags included in the source group and/or tags included in the destination group based on a data table or other data structure stored in storage 308. For example, control circuitry 304 may search the data table using an identifier of the source group and/or the destination group as a key, and retrieve, from the data table, the tags included in the source group and/or the destination group. In some embodiments, when a group includes multiple tags (e.g., as described here, the Engineering group includes the tag "Electrical Engineering" and the tag "Mechanical Engineering"), control circuitry 304 may select one of the tags for a first iteration of process 500, and on subsequent iterations, may select another one of the tags included in the group.

At 508, control circuitry 304 identifies an address of a host (the "source host") assigned to the tag of the source group (e.g., the "Finance" tag). Control circuitry 304 may determine that the source host is assigned to the tag based on a data table (e.g., host table 408 or host table 422). For example, control circuitry 304 may retrieve, from the data table, identifiers of one or more hosts that are assigned to the tag "Finance," and select one of the hosts (e.g., the source host, that is, host 250A). Control circuitry 304 may then retrieve the address of the source host (e.g., host 250A) from the data table. Continuing with the example shown in FIG. 1, control circuitry 304 retrieves the address 20.0.0.1 of host 250A from the data table. In some embodiments, the source host is a new host connected to the network for the first time, while in other embodiments, the source host is a host that is being reconnected to the network after previously being disconnected. Illustrative processes for assigning tags to hosts and building a table associating tags with hosts are described further below with reference to FIGS. 7 and 8, and illustrative processes for identifying the address of a host (such as the source host) are further described below with reference to FIGS. 9A and 9B.

At 510, control circuitry 304 identifies an address of a host (the "destination host") assigned to the tag of the destination group (i.e., the "Electrical Engineering" tag). Control circuitry 304 may determine that the destination host is assigned to the tag based on the data table. For example, control circuitry 304 may retrieve, from the data table, identifiers of one or more hosts that are assigned to the tag "Electrical Engineering," and select one of the hosts (e.g., the destination host, that is, host 252). Control circuitry 304 may then retrieve the address of the destination host (e.g., host 252) from the data table. In the example shown in FIG. 1, control circuitry 304 retrieves the address 10.0.0.1 of host 252 from the data table. Illustrative processes for assigning tags to hosts and building a table associating tags with hosts are described further below with reference to FIGS. 7 and 8, and illustrative processes for identifying the address of a host (such as the destination host) are further described below with reference to FIGS. 9A and 9B. Those skilled in the art will appreciate that process 500 may be iteratively repeated, and in subsequent iterations, control circuitry 304 may select a different destination host at 510.

At 512, control circuitry 304 extracts, from the security policy rule (received at 502), an action of the security policy and a network protocol of the security policy. For example, (as described above with reference to FIG. 1) security policy 102 includes a rule 110 listing an action (in this example, deny), and a network protocol (in this example, ICMP) of the security policy rule. Control circuitry 304 extracts the action "deny" and the network protocol "ICMP" from security policy rule 110.

At 514, control circuitry 304 generates an ACL entry (e.g., ACL entry 162 of FIG. 1). Control circuitry 304 may generate an ACL entry comprising the action and network protocol extracted at 512, the address of the source host (as identified at 508) as the source and the address of the destination host (as identified at 510) as the destination. For example, control circuitry 304 may generate an ACL entry (e.g., ACL entry 162) prohibiting ICMP traffic originating at address 20.0.0.1 (the address of host 250A) and destined for address 10.0.0.1 (the address of host 252). Those skilled in the art will appreciate that process 500 may be iteratively repeated, and in subsequent iterations, the address of a different destination host assigned to the tag may be used as the destination address of a subsequently generated ACL entry. An illustrative processes for generating an ACL entry is further described below with reference to FIG. 10.

At 516, control circuitry 304 identifies a network device connected to the source host via a network interface. For example, control circuitry 304 determines, based on host table 422, that host 250A is connected to network device 210. In some embodiments, when device 300 is a network device (e.g., network device 210), control circuitry 304 determines that host 250A is connected to the network device based on a MAC table, an ARP table, and/or a NDP table.

At 518, control circuitry 304 stores the ACL entry in storage of the network device connected to the source host (e.g., network device 210). For example, if the source host is connected to device 300, control circuitry 304 will store the ACL entry in the ACL for device 300 (e.g., ACL 406 of FIG. 4A).

Those skilled in the art will recognize that, while process 500 is described using IPv4 addresses as an example, other addresses, such as IPv6 and MAC addresses, may be substituted for the described IPv4 addresses.

Figure 6:
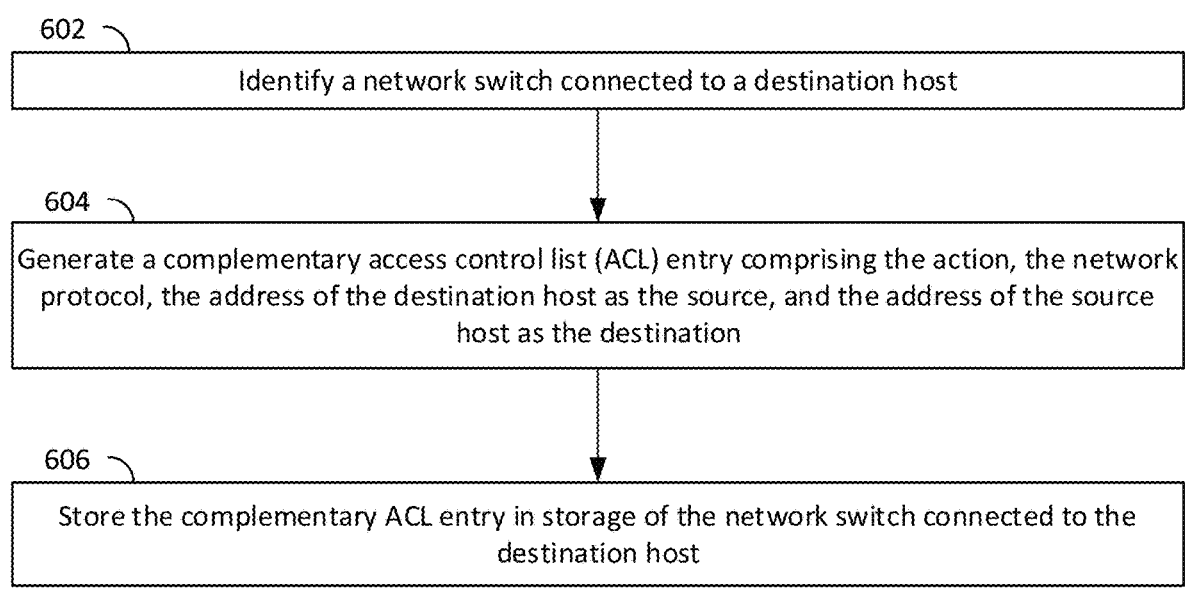
FIG. 6 is a flowchart of an illustrative process for generating complementary ACL entries for other switches affected by the security policy, in accordance with some embodiments of the present disclosure.

FIG. 6 is a flowchart of an illustrative process for generating complementary ACL entries for other network devices affected by the security policy, in accordance with some embodiments of the present disclosure. For example, process 600 illustrates how device 300 (e.g., network device 210 or network controller 260) identifies other network devices to which security policy 102 applies and generates complementary ACL entries for those network devices. In some embodiments, the steps of process 600 are performed after process 500 of FIG. 5 is completed.

At 602, control circuitry 304 identifies a network device connected to a destination host. The destination host may be connected to the same network device as the source host or may be connected to a different network device. Control circuitry 304 may determine to which network device the destination host is connected by looking up the address of the destination host in host table 422 or 408.

At 604, control circuitry 304 generates a complementary ACL entry comprising the action and the network protocol (extracted at 512), the network address of the destination host (identified at 510) as the source, and the network address of the source host (identified at 508) as the destination. In this example, control circuitry 304 generates a complementary ACL entry prohibiting ICMP traffic from the Engineering group to the Finance group.

At 606, control circuitry 304 stores the complementary ACL entry in storage of the network device connected to the destination host. In embodiments where the destination host is connected to the same network device (e.g., network device 210) as the source host, control circuitry 304 stores the complementary ACL entry in the storage of the same network device. Alternatively, in embodiments where the destination host is connected to a different network device (e.g., network device 220) than the network device connected to the source host, control circuitry 304 transmits the complementary ACL entry to the network device (e.g., network device 220) connected to the destination host. The complementary ACL entry may be stored in an ACL (e.g., ACL 406) of that network device, and may be associated with one of its network interfaces (e.g., one of network interfaces 222A-J).

Figure 7:
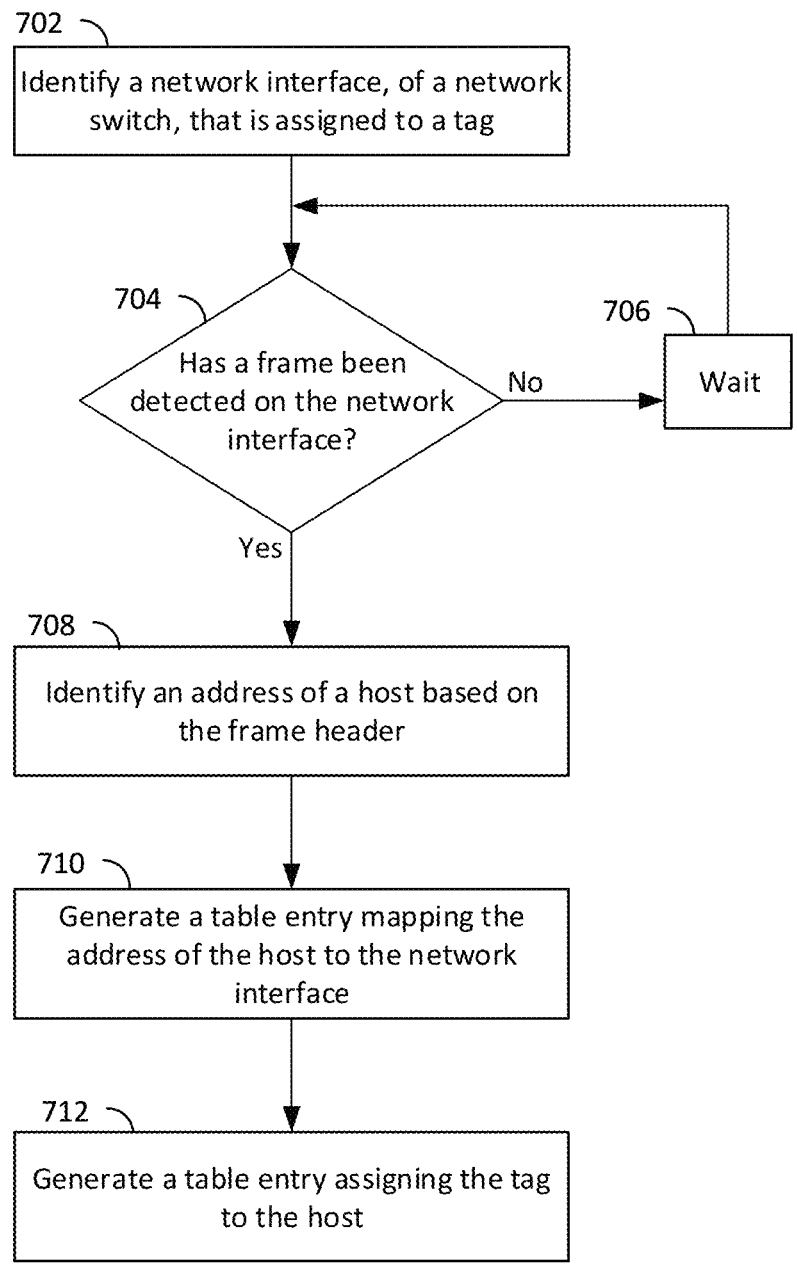
FIG. 7 is a flowchart of an illustrative process for assigning a tag to a host connected to a network interface, in accordance with some embodiments of the present disclosure.

FIG. 7 is a flowchart of an illustrative process 700 for how a network device, such as network device 210, may automatically assign tags to various hosts connected to the network device based on the tags assigned to the interfaces via which the hosts are connected to the network device. Process 700 further illustrates how a table (e.g., host table 408 and/or host table 422) indicating a mapping of host address to network interfaces, and a mapping of tags to hosts, is built. In some embodiments, process 700 is performed continuously as new hosts are connected to a network in order to continually update and maintain the aforementioned tables. In other embodiments, process 700 is performed on demand when ACL entries are generated. For example, process 700 may be performed as a subprocess of steps 508 and/or 510 of FIG. 5.

At 702, control circuitry 304 identifies a network interface of a network device that is assigned a tag. As discussed above with respect to FIG. 1, tags may be assigned to one or more interfaces of a network device. For example, network device 210 may have a tag ("Finance") assigned to network interface 212D (e.g., Et1). Control circuitry 304 of device 300 (e.g., network device 210) may identify a tag ("Finance") associated with network interface 212D. In some embodiments, control circuitry 304 receives the tag for network interface 212D via user input (e.g., via a command line interface). In other embodiments, control circuitry 304 retrieves the tag from a server (e.g., via network interface 310), from the network device (e.g., network device 210) or from storage 308 (e.g., from a table mapping the tags to interfaces of network device 210).

At 704, control circuitry 304 determines whether a frame (e.g., an address announcement message (such as a gratuitous ARP request message, a gratuitous ARP reply message, a gratuitous NDP advertisement message, a data packet, etc.)) has been detected on the network interface (e.g., network interface 212D). If a frame is not detected, process 700 proceeds to 706 where control circuitry 304 waits until a frame is detected. In some embodiments, control circuitry 304 executes other processes until an interrupt is detected (e.g., an interrupt indicating a new frame in a buffer of network interface 212D). At the end of the waiting period, or when the interrupt is triggered, process 700 returns to 704 to determine whether a frame is detected.

If a frame is detected, process 700 proceeds to 708 where control circuitry 304 identifies an address of a host based on the frame header. For example, control circuitry 304 may receive a frame via network interface 212D and may extract an IP address from a source field of the frame header. In some embodiments, control circuitry 304 may continuously monitor network interface 322 for network addresses that are not recognized by control circuitry 304 (e.g., network addresses that are not yet stored in host table 408 and/or host table 422) and may automatically tag and update host table 408 and/or host table 422 with a record for the identified host when it is detected.

At 710, control circuitry 304 generates a table entry mapping the address of the host to the network interface. For example, control circuitry 304 may update host table 408 and/or host table 422 to include a record for host 250A. The record may include an address (20.0.0.1), an identifier of a network interface to which host 250A is connected (Et1/ interface 212D), and/or a network device corresponding to the network interface (e.g., network device 210). In some embodiments, control circuitry 304 may store host table 408 or host table 422 locally (e.g., in storage 308) or may transmit the entry for storage on a centralized device, such as storage on a server.

At 712, control circuitry 304 generates a table entry assigning the tag to the host. For example, control circuitry 304 may update the entry generated at 712 or may add another entry to host table 408 and/or host table 422 to associate the tag (e.g., the tag "Finance") with the address of the host (host 250A).

Figure 8:
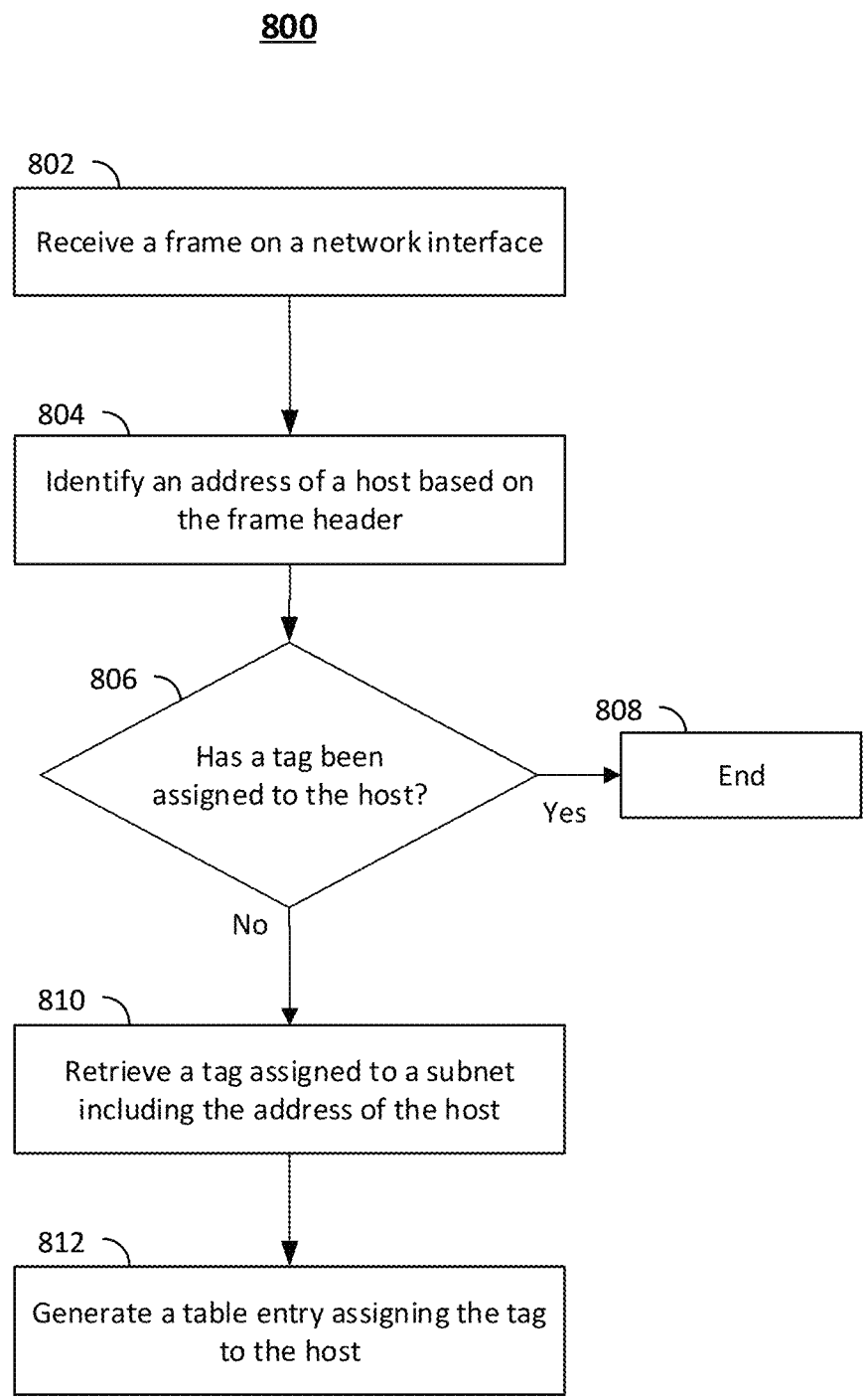
FIG. 8 is a flowchart of an illustrative process for assigning a tag to a host based on a subnet of the host, in accordance with some embodiments of the present disclosure.

FIG. 8 is a flowchart of an illustrative process 800 for assigning a tag to a host based on a subnet of the host, in accordance with some embodiments of the present disclosure. While FIG. 7 describes embodiments where tags are assigned to network interfaces, and hosts are given the tag of the interface via which the host is connected to the network device, FIG. 8 describes embodiments where tags are assigned to subnets, and hosts are given the tag of the subnet that includes the address of the host. For example, process 800 identifies the address of the host (e.g., host 250A) and identifies a tag assigned to the subnet including the address of the host. In some embodiments, process 800 is performed continuously as new hosts are connected to a network in order to continually update and maintain a table mapping tags to hosts. In other embodiments, process 800 is performed on demand when ACL entries are generated. For example, process 800 may be performed as a subprocess of steps 508 and/or 510 of FIG. 5.

At 802, control circuitry 304 receives a frame (e.g., an address announcement message (such as a gratuitous ARP request message, a gratuitous ARP reply message, a gratuitous NDP advertisement message, a data packet, etc.)) on a network interface (e.g., network interface 212D). For example, control circuitry 304 may continuously monitor network interface 212D to detect any frames received on network interface 212D.

At 804, control circuitry 304 identifies an address of a host based on a header of the frame received at 802. For example, control circuitry 304 may receive a frame via network interface 212D and may extract an IP address from a source field of the frame header.

At 806, control circuitry 304 determines whether a tag has been assigned to the host. For example, control circuitry 304 may perform a lookup of the address of the host (i.e., the address identified at 804) in a data table (e.g., host table 408 or host table 422) to determine if the address of the host is included in an entry for a tag. If control circuitry 304 determines that a tag has been assigned to the host, process 800 proceeds to 808 where process 800 ends. If control circuitry 304 determines that a tag has not been assigned to the host, process 800 proceeds to 810.

At 810, control circuitry 304 retrieves a tag assigned to a subnet including the address of the host. For example, control circuitry 304 may identify a subnet (or IP prefix) including the address of the host (as identified at 804). Control circuitry 304 may then search the data table for an entry indicating the tag that is assigned to the subnet. In some embodiments, control circuitry 304 may retrieve the tag assigned to the subnet from a separate device (e.g., network controller 260).

At 812, control circuitry 304 generates a table entry assigning the tag to the host. For example, control circuitry 304 may update an entry for the tag in the data table (e.g., host table 408 and/or host table 422) or may add another entry to the data table to associate the tag (e.g., the tag "Finance") with the address of the host (host 250A).

Figures 9A, 9B:
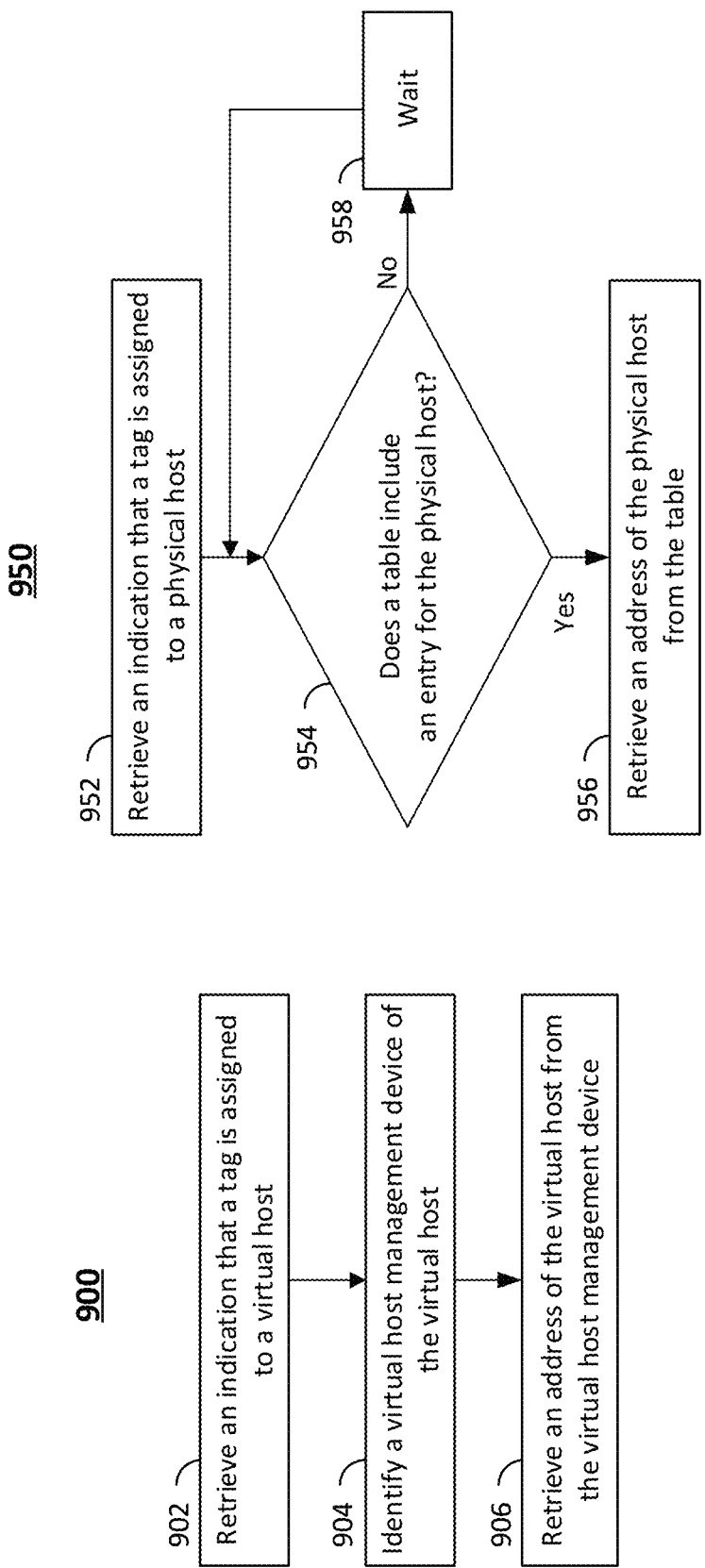
FIG. 9A is a flowchart of an illustrative process for retrieving an address of a virtual host assigned to a tag, in accordance with some embodiments of the present disclosure.
FIG. 9B is a flowchart of an illustrative process for retrieving an address of a physical host assigned to a tag, in accordance with some embodiments of the present disclosure.

FIG. 9A is a flowchart of an illustrative process 900 for retrieving an address of a virtual host assigned to a tag, in accordance with some embodiments of the present disclosure. For example, process 900 identifies the address of virtual host 258B assigned to the tag "Electrical Engineering." In some embodiments, process 900 is performed continuously to update and maintain a table mapping tags to hosts. In other embodiments, process 900 is performed on demand when ACL entries are generated. For example, process 900 may be performed as a subprocess of steps 508 and/or 510 of FIG. 5.

At 902, control circuitry 304 retrieves an indication that a tag is assigned to a virtual host. For example, control circuitry 304 may look up the tag "Electrical Engineering" in host table 408 or host table 422 and may retrieve an indication that the tag is assigned to a virtual host. In some embodiments, the indication that the tag is assigned to a virtual host may include a link to a virtual host management device (e.g., virtual host management device 270) that manages virtual host 258B. In other embodiments, the indication may include a hostname or other non-network address identifier of virtual host 258B, via which control circuitry 304 may identify the virtual host management device (e.g., virtual host management device 270) that manages virtual host 258B. When control circuitry 304 determines that the tag is assigned to a virtual host, process 900 proceeds to 904 where control circuitry 304 identifies the virtual host management device that manages the virtual host. For example, in a network where multiple virtual host management devices are present, control circuitry 304 may communicate with one of the virtual host management devices that is managing virtual hosts on host 258A to identify the address of the virtual host (e.g., host 258B).

At 906 control circuitry 304 retrieves an address of the virtual host from the virtual host management device. For example, control circuitry 304 receives (e.g., via network interface 310 of FIG. 3) the IP address of virtual host 258B from virtual host management device 270. In some embodiments, control circuitry 304 updates host table 408 or host table 422 to include a record of the IP address and tag for the virtual host.

FIG. 9B is a flowchart of an illustrative process 950 for retrieving an address of a physical host assigned to a tag, in accordance with some embodiments of the present disclosure. For example, process 950 identifies the address of host 252 assigned to the tag "Electrical Engineering." In some embodiments, process 950 is performed continuously to update and maintain a table mapping tags to hosts. In other embodiments, process 950 is performed on demand when ACL entries are generated. For example, process 950 may be performed as a subprocess of steps 508 and/or 510 of FIG. 5.

At 952, control circuitry 304 retrieves an indication that a tag is assigned to a physical host. For example, control circuitry 304 may retrieve, from a table mapping tags to hosts (e.g., host table 408 or host table 422), a hostname or other non-network address identifier of host 252.

At 954, control circuitry 304 determines whether a data table (e.g., host table 408 or host table 422) includes an entry for host 252. When the data table includes an entry for host 252, process 900 proceeds to 956. When the data table does not include an entry for the host (or when the entry for the host has expired), process 950 proceeds to 958, where control circuitry 304 waits while an entry for host 252 is generated. In some embodiments, control circuitry 304 may trigger, at 958, performance of process 700 of FIG. 7 or process 800 of FIG. 8 to generate the entry for host 252. After waiting a predetermined amount of time, or upon receiving an indication that an entry for host 252 has been generated, process 950 returns to 954.

When the data table includes an entry for host 252, process 950 proceeds to 956, where control circuitry 304 retrieves an address of the host (e.g., host 252) from the data table. For example, control circuitry may retrieve an address (e.g., 10.0.0.1) of the host (e.g., host 252) from the data table (e.g., host table 408 or host table 422).

Those skilled in the art will recognize that, while process 950 is described using IPv4 addresses as an example, other addresses, such as IPv6 and MAC addresses, may be substituted for the described IPv4 addresses.

Figure 10:
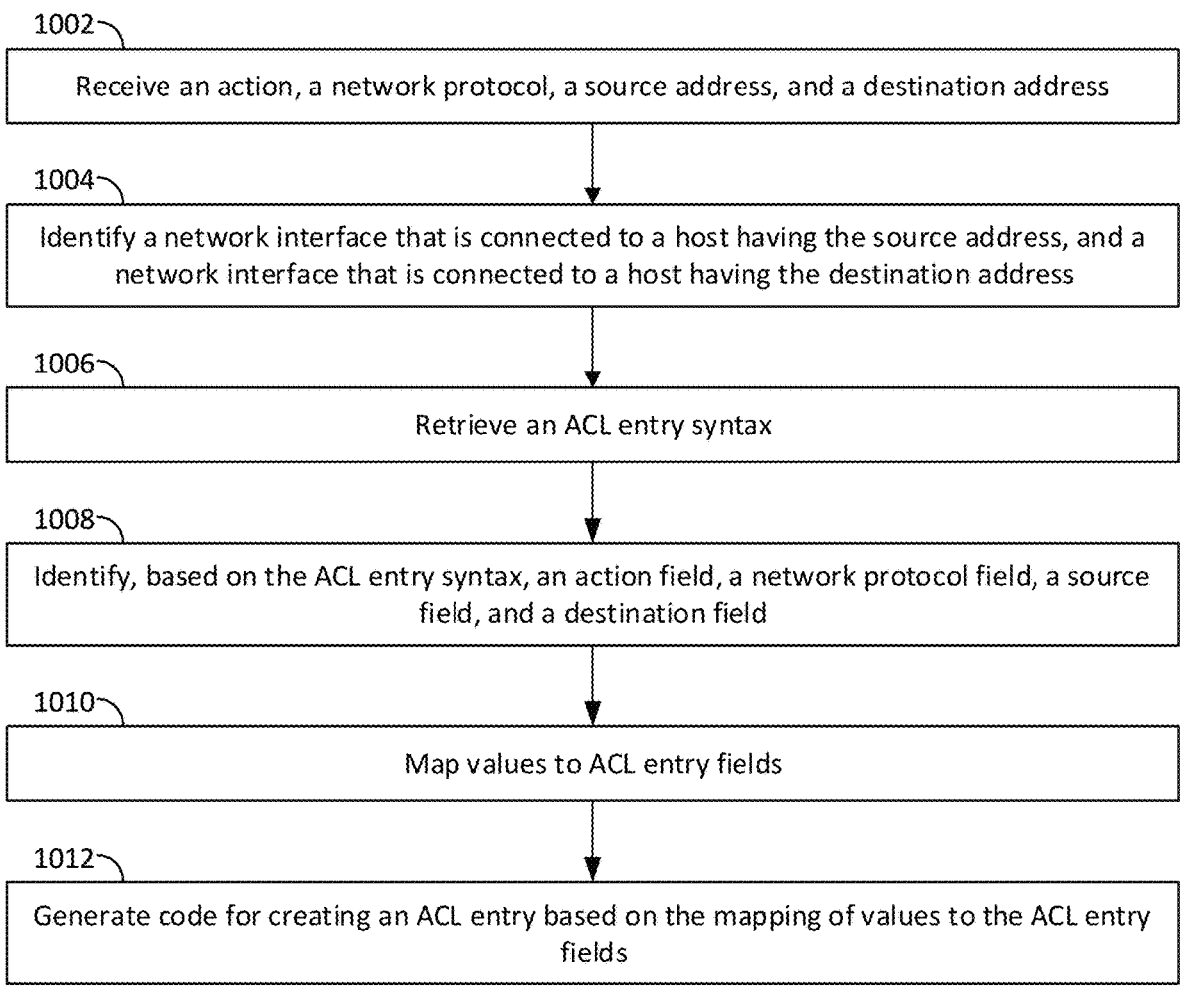
FIG. 10 is a flowchart of an illustrative process for generating code for creating ACL entries, in accordance with some embodiments of the present disclosure.

FIG. 10 is a flowchart of an illustrative process 1000 for generating code for creating ACL entries, in accordance with some embodiments of the present disclosure. In some embodiments, the steps of FIG. 10 may be performed as a subprocess of step 514 of FIG. 5.

At 1002, control circuitry 304 receives an action, a network protocol, a source address, and a destination address. For example, control circuitry 304 may receive the action and network protocol extracted from the security policy rule at 512 (of FIG. 5) and may receive the source address and destination address identified at 508 and 510 (of FIG. 5), respectively.

At 1004, control circuitry 304 identifies a network interface of a network device that is connected to a host having the source address. Control circuitry further identifies a network interface of a network device that is connected to a host having the destination address. For example, control circuitry 304 may determine that the source host (host 250A) is connected to network device 210 via network interface 212D, and that the destination host (host 252) is connected to network device 220 via network interface 222B.

At 1006, control circuitry 304 control circuitry 304 retrieves an ACL entry syntax. For example, control circuitry 304 may retrieve the ACL entry syntax from storage 308. As described above with reference to FIG. 1, the ACL entry syntax includes a plurality of fields including (i) a name field defining its function (e.g., "access-list") as well as identifiers of the network interface and direction of traffic (in this example, network interface Et2, and the ingress direction of traffic) to which the ACL entry applies; (ii) a sequence number field; (iii) an action field; (iv) a network protocol field; (v) a source field; and (vi) a destination field.

At 1008, control circuitry 304 identifies fields of the ACL entry based on the ACL entry syntax retrieved at 1006. For example, control circuitry 304 may extract, from the ACL entry syntax, type identifiers of the fields of the ACL entry. Control circuitry 304 may identify only the fields of the ACL entry that are relevant to the ACL entry being generated. For example, the ACL entry syntax may include various other fields, such as a port number field or a time restriction field, etc., and control circuitry 304 may not identify those fields when they are not needed.

At 1010, control circuitry 304 maps values to the ACL entry fields identified at 1008. For example, control circuitry 304 may map the action, network protocol, source address, and destination address (received at 1002) to the action field, the network protocol field, the source field, and the destination field identified at 1008, respectively. Control circuitry 304 may further map the network interface, identified at 1004 (e.g., Et2), to the network interface field, and may determine the direction of network traffic based on whether the network interface is connected to a host having the source address or a host having the destination address. For example, if the network interface is connected to a host having the source address, control circuitry 304 determines that the direction of network traffic is ingress. Alternatively, if the network interface is connected to a host having the destination address, control circuitry 304 determines that the direction of network traffic is egress.

At 1012, control circuitry 304 generates code for creating an ACL entry. As described in FIG. 1, the code comprises a name of the ACL (e.g., access-list), an identifier of the network interface identified at 1004 (e.g., Et2), the direction of network traffic being controlled (e.g., ingress or "in"), a sequence number of the ACL entry (e.g., 10), along with the action, network protocol, source address, and destination address received at 1002. In embodiments where device 300 is a network device, control circuitry 304 executes the code generated at 1006 to create the ACL entry. In other embodiments where device 300 is a network controller, control circuitry 304 may either transmit the code generated at 1006 to a network device (e.g., network device 210), or may execute the code at device 300 and transmit a pre-generated ACL entry to the network device to be stored in the storage of the network device. Those skilled in the art will appreciate that the ACL entry parameters described here are merely illustrative, and that various other parameters (including port numbers, time restrictions, ranges of network addresses, etc.) may be included in the code for generating the ACL entries in addition to or instead of some or all of the parameters described here.

Figure 11:
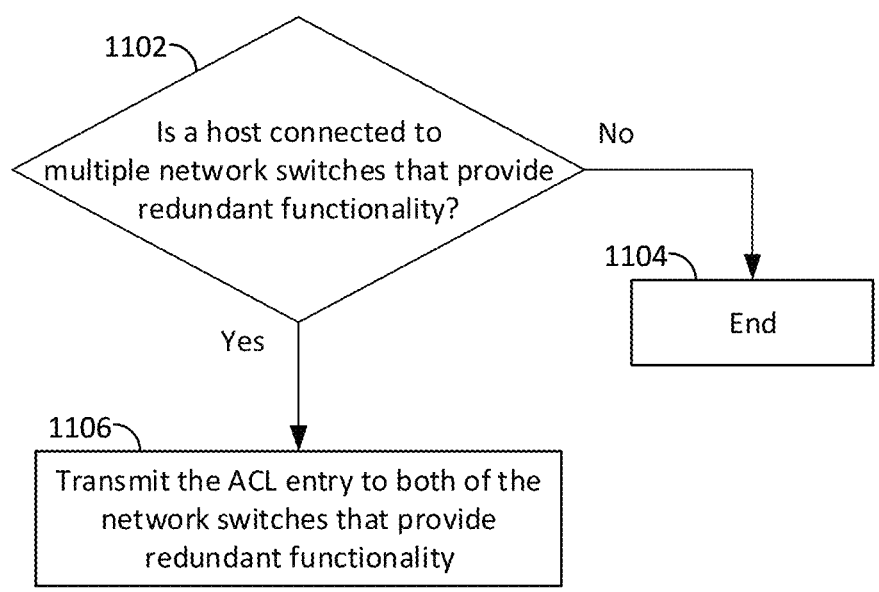
FIG. 11 is a flowchart of an illustrative process for providing ACL entries to network devices that provide redundant functionality, in accordance with some embodiments of the present disclosure.

FIG. 11 is a flowchart of illustrative process 1100 for providing ACL entries to network devices that provide redundant functionality, in accordance with some embodiments of the present disclosure. For example, process 1100 identifies network devices configured in an MLAG configuration and provides ACL entries to such network devices. In some embodiments, the steps of process 1100 are performed after processes 500 and/or 600 are completed.

At 1102, control circuitry 304 determines whether a host is connected to multiple network devices (e.g., network device 210 and network device 215) that provide redundant functionality). As discussed with respect to FIG. 2B, host 250A may be connected to network devices 210 and 215 in an MLAG configuration.

If control circuitry 304 determines that the host is not connected to multiple network devices that provide redundant functionality, process 1100 proceeds to 1104 where process 1100 ends. If control circuitry 304 determines that the host is connected to multiple network devices that provide redundant functionality (for example, that host 250A is connected to network devices 210 and 215 that are configured in an MLAG configuration), process 1100 proceeds to 1106 where control circuitry 304 transmits the ACL entry (generated at 514) to both of the network devices (e.g., network devices 210 and 215) so that both of the network devices can also enforce the security policy for traffic originating from host 250A. In embodiments where device 300 is one of the network devices 210 or 215, control circuitry 304 transmits the ACL entry to the other network device (e.g., network device 210 or 215) in the MLAG configuration.

Figure 12:
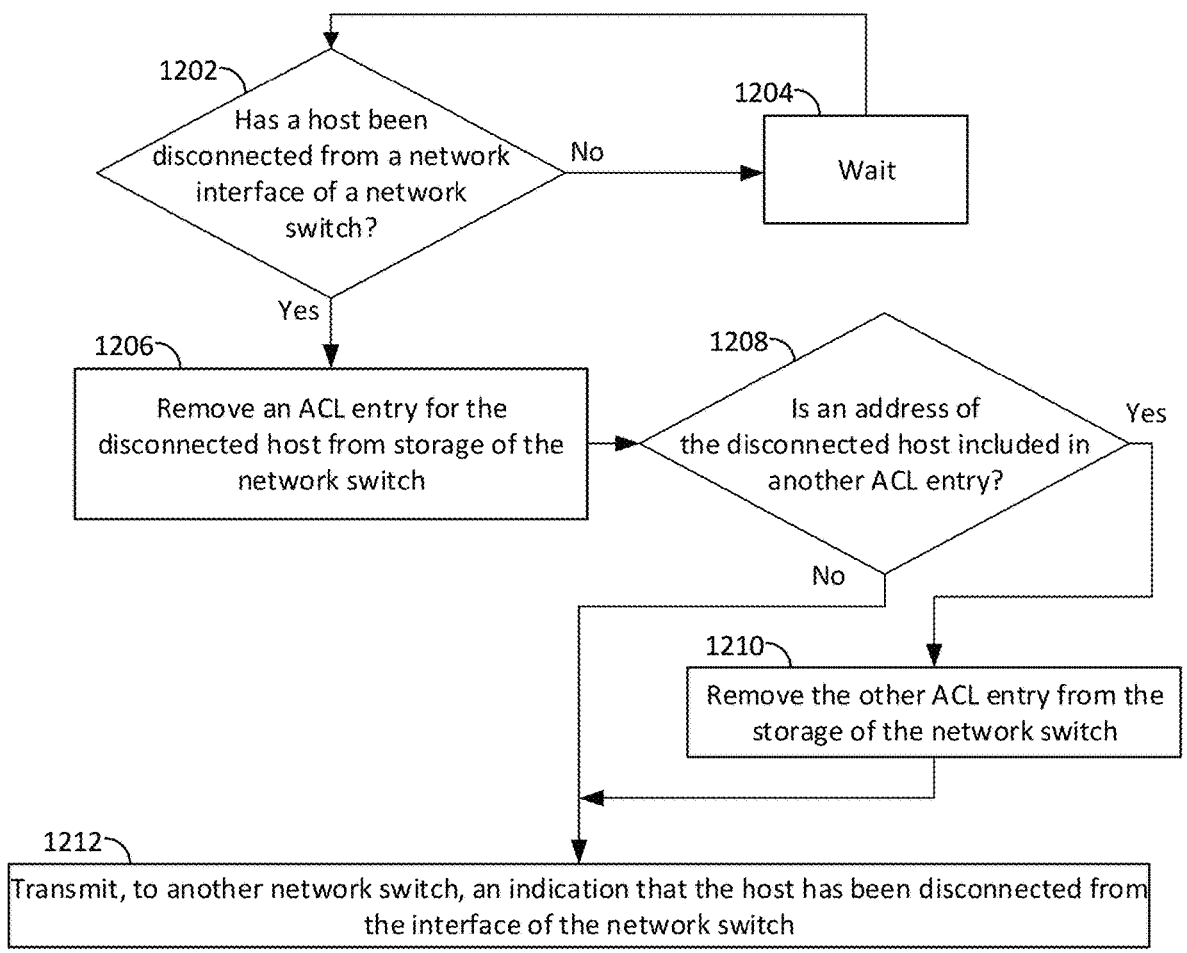
FIG. 12 is a flowchart of an illustrative process for removing ACL entries for disconnected hosts, in accordance with some embodiments of the present disclosure.

FIG. 12 is a flowchart of illustrative process 1200 for removing ACL entries for disconnected hosts, in accordance with some embodiments of the present disclosure. In some embodiments, the steps of process 1200 are performed after processes 500, 600, and/or 1100 are completed.

At 1202, control circuitry 304 determines whether a host has been disconnected from a network interface of a network device. In some embodiments, control circuitry 304 maintains the ACL of the network device (e.g., ACL 406 of network device 210), and determines whether the host (host 250A) is disconnected from the network interface of the network device. If control circuitry 304 determines that host 250A is disconnected from the network interface, at 1206, control circuitry 304 removes the ACL entry for host 250A.

In some embodiments, at 1204, control circuitry 304 waits until an expiration of the entries in host table 408 or 422, waits until receiving an interrupt signaling the disconnection of host 250A, or waits another predefined interval before determining whether host 250A is still connected to the network interface. If control circuitry 304 determines, at 1202, that the host is disconnected from the network interface, process 1200 proceeds to 1206, where control circuitry 304 removes an ACL entry for the disconnected host from the storage of the network device. For example, control circuitry 304 removes the ACL entry corresponding to the host (host 250A) from the storage of the network device (e.g., because the ACL entry is no longer needed, if the host device is not connected to the interface). For example, if host 250A is disconnected from network device 210, the ACL entry (e.g., ACL entries 162, 164, and 166) in ACL 406 is removed because host 250A is no longer connected to network device 210, and network device 210 therefore cannot enforce the security policy.

In some embodiments, if host 250A moves from network device 220 to network device 230 (represented by host 250B in FIG. 2A), the system will detect the presence of host 250B and will apply some or all of the steps described in process 500 to translate the security policy into ACL entries corresponding to host 250B. Illustrative processes for translating security policies into ACL entries for devices that move on a network are described above with reference to FIG. 10.

At 1208, control circuitry 304 determines whether an address of the disconnected host (e.g., host 250A) is included in other ACL entries. For example, control circuitry 304 determines whether the address 20.0.0.1 is included in another ACL entry stored on network device 210. In some embodiments, control circuitry 304 performs a search of ACL 160 to find other ACL entries including the address 20.0.0.1. If control circuitry 304 determines that the address is included in other ACL entries, process 1200 proceeds to 1210, where control circuitry 304 removes the other ACL entries including the address of the disconnected host (e.g., host 250A) from the storage of the network device (e.g., network device 210). If control circuitry 304 determines that there are no other ACL entries including the address of the disconnected host remaining in the storage of the network device, process 1200 proceeds to 1212.

At 1212, control circuitry 304 transmits, to another network device (e.g., network device 240), an indication that the host has been disconnected from the network interface of the network device (e.g., network device 210). For example, control circuitry 304 may identify the network device (e.g., network device 220) to which the host (e.g. host 252) is connected and transmit to the network device the indication that the host (e.g., host 250A) has been disconnected from the network device (e.g., network device 210). Control circuitry 304 may identify the network device based on a data table stored in storage 308.

When a host, such as host 250A, is disconnected from a network device, (e.g., network device 210) and connected to a new network device (e.g., network device 230), the system updates the ACL on the new network device when the security policy is applicable.

The processes 500, 600, 700, 800, 900, 950, 1000, 1100, and 1200 described above are intended to be illustrative and not limiting. More generally, the above disclosure is meant to be illustrative and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

It will be apparent to those of ordinary skill in the art that methods involved in the present disclosure may be embodied in a computer program product that includes a non-transitory computer-usable and/or -readable medium. For example, such a non-transitory computer-usable medium may consist of a read-only memory device, such as a CD-ROM disk or conventional ROM device, or a random-access memory, such as a hard drive device or a computer diskette, having a computer-readable program code stored thereon. It should also be understood that methods, techniques, and processes involved in the present disclosure may be executed using processing circuitry.

What is claimed is:

1. A method comprising:
   identifying a tag included in a group specified by a security policy;
   discovering a host identifier of a first host on an interface of a switch;
   determining whether the host identifier of the first host is assigned to the tag; and
   responsive to determining that the host identifier of the first host is assigned to the tag, translating the security policy into an access-control list (ACL) entry for the switch, the translating the security policy into the ACL entry comprising:
      receiving the security policy;
      extracting, from the security policy, an action, a network protocol, an identifier of a source group, and an identifier of a destination group, wherein the source group includes the first tag and the destination group includes a second tag; and
      generating the ACL entry for the switch comprising the action and at least one of the network protocol, the host identifier of the first host as a source address, or a host identifier of a second host, to which the second tag is assigned, as a destination address.

2. The method of claim 1, wherein generating the ACL entry for the switch comprises:
   identifying the first tag included in the source group;
   retrieving the host identifier of the first host that is assigned to the first tag; and
   selecting the host identifier of the first host as the source address of the ACL entry for the switch.

3. The method of claim 1 further comprising:
   identifying the second tag included in the destination group;
   retrieving one or more host identifiers assigned to the second tag; and
   selecting the host identifier of the second host, from the one or more host identifiers, as the destination address of the ACL entry for the switch.

4. The method of claim 3, wherein the ACL entry for the switch is a first ACL entry, the method further comprising:
   selecting a host identifier of a third host, from the one or more host identifiers; and
   generating a second ACL entry comprising the action, the network protocol, the host identifier of the first host as the source address, and the host identifier of the third host as the destination address.

5. The method of claim 3, wherein identifying the second tag included in the destination group comprises:
   retrieving, from a data store, one or more tags associated with the identifier of the destination group; and
   selecting a given tag, of the one or more tags, as the second tag.

6. The method of claim 1, wherein the switch is a first switch and the interface is a first interface, the method further comprising:
   identifying a second switch having a second interface to which the second host is connected;
   generating a complementary ACL entry comprising the action, the network protocol, the host identifier of the second host as the source address, and the host identifier of the first host as the destination address; and transmitting the complementary ACL entry to the second switch.

7. The method of claim 1, wherein the switch is a first switch and the interface is a first interface, the method further comprising:

identifying a second switch having a second interface to which the first host is connected; and transmitting the ACL entry for the switch to the second switch.

8. The method of claim 7, wherein identifying the second switch comprises determining that the second switch provides redundant functionality to the first switch.

9. The method of claim 1, further comprising:

determining whether the second tag is assigned to a virtual host; and responsive to determining that the second tag is assigned to a virtual host, retrieving the host identifier of the second host from a virtual host management device.

10. The method of claim 1, wherein the ACL entry for the switch is a first ACL entry, the action is a first action, the network protocol is a first network protocol, and the method further comprises:

generating a second ACL entry comprising a second action, a second network protocol, a network address of a third host as the source address, and a network address of a fourth host as the destination address, wherein the first host is different from the third host and the fourth host;

transmitting the first ACL entry to the switch; and refraining from transmitting the second ACL entry to the switch.

11. The method of claim 1, further comprising:

determining whether the first host has been disconnected from the interface of the switch; and responsive to determining that the first host has been disconnected from the interface of the switch, removing the ACL entry for the switch from the switch.

12. The method of claim 11, wherein the ACL entry for the switch is a first ACL entry, the method further comprising:

determining whether the host identifier of the first host is included in a second ACL entry; and responsive to determining that the host identifier of the first host is included in a second ACL entry, removing the second ACL entry from the switch.

13. The method of claim 11, wherein the switch is a first switch and the ACL entry for the switch is a first ACL entry, the method further comprising:

identifying a second switch to which the second host is connected; and transmitting to the second switch an indication that the first host has been disconnected from the interface of the first switch.

14. The method of claim 1, wherein discovering the host identifier of the first host on the interface of the switch comprises:

receiving an address resolution message;

extracting, from the address resolution message, the host identifier of the first host;

determining whether the host identifier of the first host is included in a table of hosts connected to the interface of the switch; and responsive to determining that the host identifier of the first host is not included in the table, adding an entry for the host identifier of the first host to the table.

15. The method of claim 14, further comprising:

identifying a tag assigned to the interface of the switch; and adding the tag assigned to the interface of the switch to the entry for the host identifier of the first host.

16. The method of claim 14, further comprising:

identifying a subnet that includes the host identifier of the first host;

identifying a tag assigned to the subnet; and adding the tag assigned to the subnet to the entry for the host identifier of the first host.

17. The method of claim 1, wherein discovering the host identifier of the first host on the interface of the switch comprises:

receiving a data packet;

extracting, from a header of the data packet, the host identifier of the first host;

determining whether the host identifier of the first host is included in a table of hosts connected to the interface of the switch; and responsive to determining that the host identifier of the first host is not included in the table, adding the host identifier of the first host to the table.

18. A system comprising:

input circuitry configured to receive a security policy specifying a group; and control circuitry configured to:

identify a tag included in the group;

discover a host identifier of a first host on an interface of a switch;

determine whether the host identifier of the first host is assigned to the tag; and responsive to determining that the host identifier of the first host is assigned to the tag, translate the security policy into an access-control list (ACL) entry for the switch, wherein the tag is a first tag, and the control circuitry is further configured to:

extract, from the security policy, an action, a network protocol, an identifier of a source group, and an identifier of a destination group, wherein the source group includes the first tag and the destination group includes a second tag, and generate the ACL entry for the switch comprising the action and at least one of the network protocol, the host identifier of the first host as a source address, or a host identifier of a second host, to which the second tag is assigned, as a destination address.

19. The system of claim 18, wherein the control circuitry is configured to generate the ACL entry for the switch by:

identifying the first tag included in the source group;

retrieving the host identifier of the first host that is assigned to the first tag; and selecting the host identifier of the first host as the source address of the ACL entry for the switch.

20. The system of claim 18, wherein the control circuitry is further configured to:

identify the second tag included in the destination group;

retrieve one or more host identifiers assigned to the second tag; and select the host identifier of the second host, from the one or more host identifiers, as the destination address of the ACL entry for the switch.

21. The system of claim 20, wherein the ACL entry for the switch is a first ACL entry, and the control circuitry is further configured to:

select a host identifier of a third host, from the one or more host identifiers; and generate a second ACL entry comprising the action, the network protocol, the host identifier of the first host as the source address, and the host identifier of the third host as the destination address.

22. The system of claim 20, wherein the control circuitry is configured to identify the second tag included in the destination group by:
retrieving, from a data store, one or more tags associated with the identifier of the destination group; and
selecting a given tag, of the one or more tags, as the second tag.

23. The system of claim 18, wherein the switch is a first switch and the interface is a first interface, and the control circuitry is further configured to:
identify a second switch having a second interface to which the second host is connected;
generate a complementary ACL entry comprising the action, the network protocol, the host identifier of the second host as the source address, and the host identifier of the first host as the destination address; and
transmit the complementary ACL entry to the second switch.

24. The system of claim 18, wherein the switch is a first switch and the interface is a first interface, and the control circuitry is further configured to:
identify a second switch having a second interface to which the first host is connected; and
transmit the ACL entry for the switch to the second switch.

25. The system of claim 24, wherein the control circuitry is configured to identify the second switch by determining that the second switch provides redundant functionality to the first switch.

26. The system of claim 18, wherein the control circuitry is further configured to:
determine whether the second tag is assigned to a virtual host; and
responsive to determining that the second tag is assigned to a virtual host, retrieve the host identifier of the second host from a virtual host management device.

27. The system of claim 18, wherein the ACL entry for the switch is a first ACL entry, the action is a first action, the network protocol is a first network protocol, and the control circuitry is further configured to:
generate a second ACL entry comprising a second action, a second network protocol, a network address of a third host as the source address, and a network address of a fourth host as the destination address, wherein the first host is different from the third host and the fourth host;
transmit the first ACL entry to the switch; and
refrain from transmitting the second ACL entry to the switch.

28. The system of claim 18, wherein the control circuitry is further configured to:
determine whether the first host has been disconnected from the interface of the switch; and
responsive to determining that the first host has been disconnected from the interface of the switch, remove the ACL entry for the switch from the switch.

29. The system of claim 28, wherein the ACL entry for the switch is a first ACL entry, and the control circuitry is further configured to:
determine whether the host identifier of the first host is included in a second ACL entry; and
responsive to determining that the host identifier of the first host is included in a second ACL entry, remove the second ACL entry from the switch.

30. The system of claim 28, wherein the switch is a first switch and the ACL entry for the switch is a first ACL entry, and the control circuitry is further configured to:
identify a second switch to which the second host is connected; and
transmit to the second switch an indication that the first host has been disconnected from the interface of the first switch.

31. The system of claim 18, wherein the control circuitry is configured to discover the host identifier of the first host on the interface of the switch by:
receiving an address resolution message;
extracting, from the address resolution message, the host identifier of the first host;
determining whether the host identifier of the first host is included in a table of hosts connected to the interface of the switch; and
responsive to determining that the host identifier of the first host is not included in the table, adding an entry for the host identifier of the first host to the table.

32. The system of claim 31, wherein the control circuitry is further configured to:
identify a tag assigned to the interface of the switch; and
add the tag assigned to the interface of the switch to the entry for the host identifier of the first host.

33. The system of claim 31, wherein the control circuitry is further configured to:
identify a subnet that includes the host identifier of the first host;
identify a tag assigned to the subnet; and
add the tag assigned to the subnet to the entry for the host identifier of the first host.

34. The system of claim 18, wherein the control circuitry is configured to discover the host identifier of the first host on the interface of the switch by:
receiving a data packet;
extracting, from a header of the data packet, the host identifier of the first host;
determining whether the host identifier of the first host is included in a table of hosts connected to the interface of the switch; and
responsive to determining that the host identifier of the first host is not included in the table, adding the host identifier of the first host to the table.

* * * * *